US012652360B2

(12) United States Patent (10) Patent No.: US 12,652,360 B2

Tanaka et al. (45) Date of Patent: Jun. 9, 2026

(54) APPARATUS PROVIDED WITH READING UNIT TO READ MANUSCRIPT ON READING SURFACE AND TO CHANGE SETTINGS BASED ON READING

(71) Applicant: BROTHER KOGYO KABUSHIKI KAISHA, Nagoya (JP)

(72) Inventors: Nobumasa Tanaka, Nagoya (JP); Naoyuki Nakamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 207 days.

(21) Appl. No.: 18/468,132

(22) Filed: Sep. 15, 2023

(65) Prior Publication Data

US 2024/0106946 A1 Mar. 28, 2024

(30) Foreign Application Priority Data

Sep. 26, 2022 (JP) ................................. 2022-152252

(51) Int. Cl.
*H04N 1/00* (2006.01)
(52) U.S. Cl.
CPC ..... *H04N 1/00779* (2013.01); *H04N 1/00381* (2013.01); *H04N 1/00702* (2013.01); *H04N 1/00822* (2013.01); *H04N 1/00827* (2013.01)
(58) Field of Classification Search
CPC ........... H04N 1/00779; H04N 1/00381; H04N 1/00702; H04N 1/00822; H04N 1/00827
See application file for complete search history.

(56) References Cited

U.S. PATENT DOCUMENTS

| | | | | | |
|---|---|---|---|---|---|
| 6,011,635 | A | * | 1/2000 | Bungo | ................. H04N 1/3873 |
| | | | | | 358/463 |
| 2012/0314263 | A1 | * | 12/2012 | Kawata | .................... H04N 1/10 |
| | | | | | 358/474 |
| 2013/0258423 | A1 | * | 10/2013 | Omi | .................... H04N 1/00782 |
| | | | | | 358/474 |
| 2013/0321858 | A1 | * | 12/2013 | Takabatake | ............. G06F 3/005 |
| | | | | | 358/1.15 |
| 2013/0329247 | A1 | * | 12/2013 | Takabatake | ........ H04N 1/00241 |
| | | | | | 358/1.15 |
| 2014/0240799 | A1 | * | 8/2014 | Sakai | ..................... H04N 1/047 |
| | | | | | 358/488 |
| 2015/0055168 | A1 | * | 2/2015 | Kato | .................... G06K 15/005 |
| | | | | | 358/1.15 |
| 2015/0098115 | A1 | * | 4/2015 | Arai | .................. H04N 1/00809 |
| | | | | | 358/434 |

(Continued)

FOREIGN PATENT DOCUMENTS

JP 2020057836 A 4/2020

*Primary Examiner* — Nicholas Pachol
(74) *Attorney, Agent, or Firm* — Scully, Scott, Murphy & Presser, P.C.

(57) ABSTRACT

An apparatus includes: a reading surface; a reading unit configured to read a manuscript on the reading surface; and a controller. The controller is configured to: cause the reading unit to perform a body reading operation of reading a part, of a body of a user, placed on the reading surface, and perform a setting of the apparatus or of a peripheral device configured to communicate with the apparatus, based on body reading data obtained from a result of a reading of the reading unit in a case that the controller causes the reading unit to perform the body reading operation.

29 Claims, 25 Drawing Sheets

(56)     References Cited

U.S. PATENT DOCUMENTS

| | | | |
|---|---|---|---|
| 2015/0181059 A1* | 6/2015 | Hu ...................... | H04N 1/3876 |
| | | | 358/509 |
| 2016/0156857 A1* | 6/2016 | Hu ......................... | H04N 1/195 |
| | | | 358/509 |
| 2018/0035077 A1* | 2/2018 | Sato ................... | H04N 1/19594 |
| 2021/0112168 A1* | 4/2021 | Takatoh ............. | H04N 1/00896 |

* cited by examiner

FIG. 4A
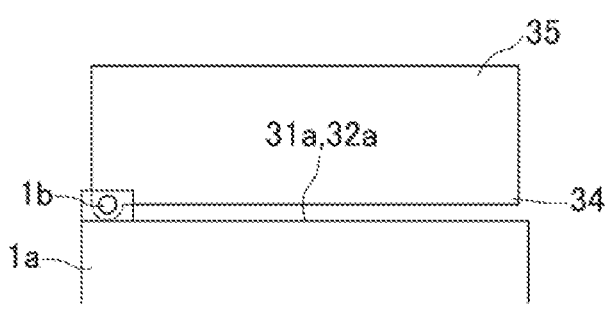
UPPER
SIDE
↑ UP-DOWN
↓ DIRECTION
LOWER
SIDE
⟶
CONVEYING
DIRECTION
FIG. 4B
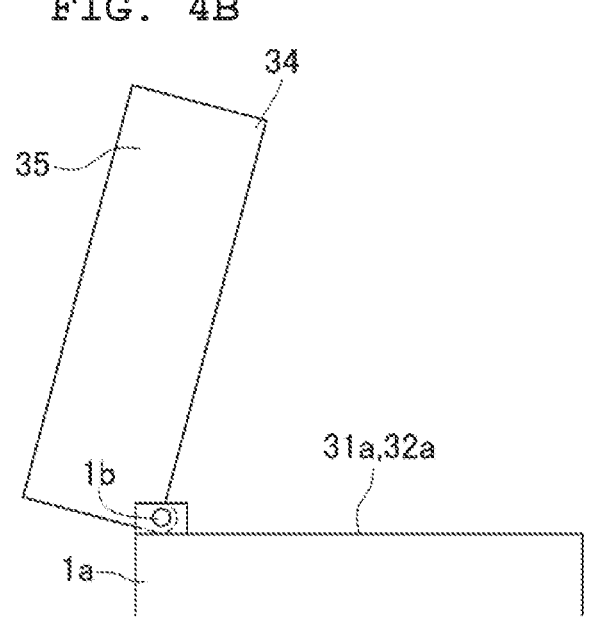
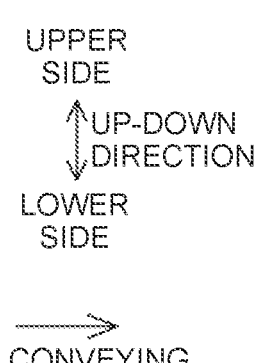
UPPER
SIDE
↑ UP-DOWN
↓ DIRECTION
LOWER
SIDE
⟶
CONVEYING
DIRECTION

SCANNING DIRECTION

LEFT SIDE ⟸⟹ RIGHT SIDE

CONVEYING DIRECTION

SCANNING DIRECTION

LEFT SIDE ⟸⟹ RIGHT SIDE

CONVEYING DIRECTION

BODY POSITION INFORMATION
OBTAINING PROCESSING

BODY READING PROCESSING — S401

OBTAIN BODY READING DATA — S402

S502

LIGHT RECEIVING PART
IN WHICH VALUE OF SIGNAL
OUTPUTTED THEREFROM IS CHANGED
BY EQUAL TO OR MORE THAN
PREDETERMINED AMOUNT
PRESENT?

NO

YES

OBTAIN POSITION INFORMATION
OF FINGER — S404

RETURN

FIG. 11B

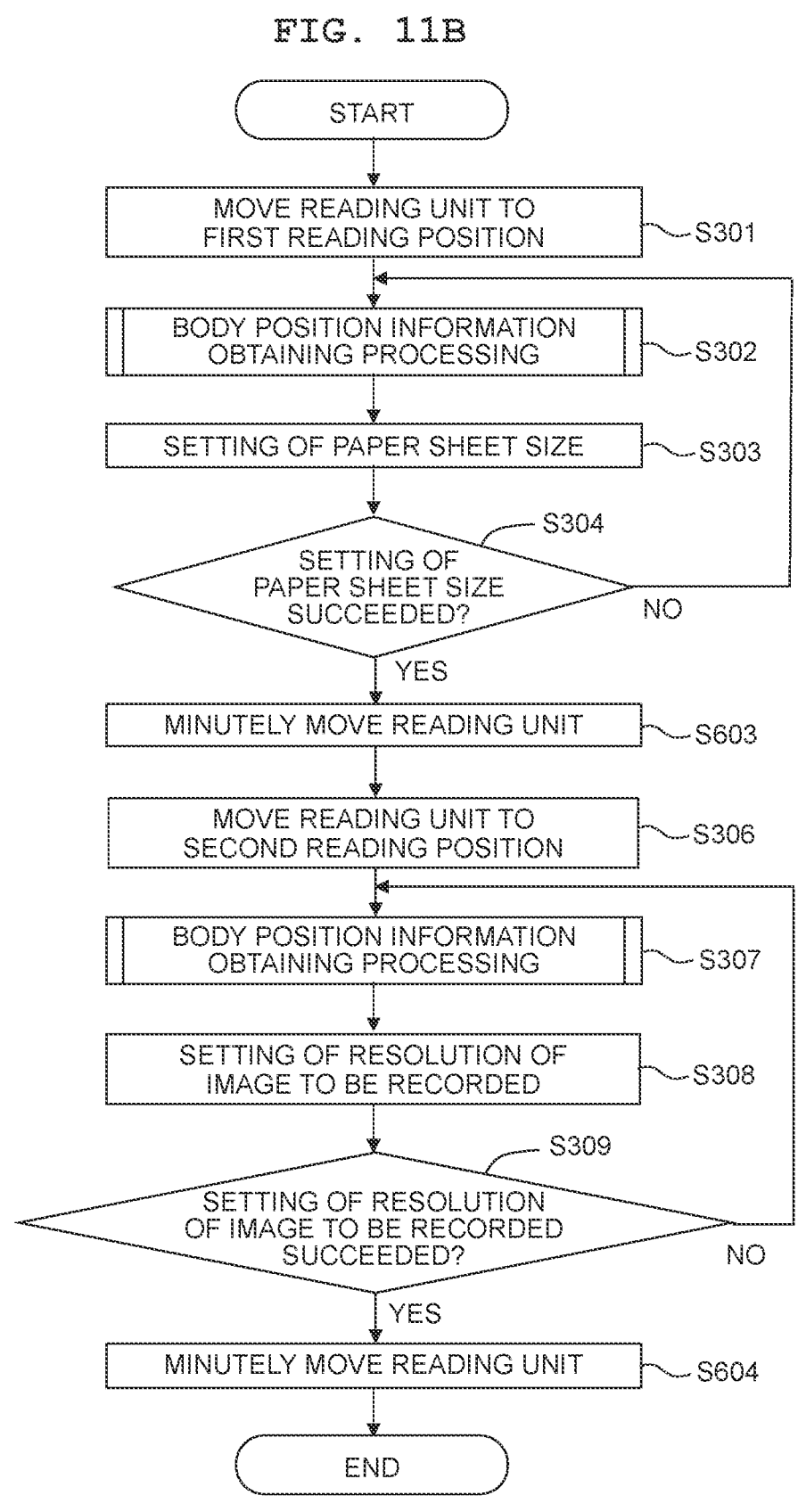

```
        ( START )
            │
            ▼
┌───────────────────────────┐
│   MOVE READING UNIT TO     │── S301
│   FIRST READING POSITION   │
└───────────────────────────┘
            │
            ▼
┌───────────────────────────┐
│ BODY POSITION INFORMATION  │── S302
│   OBTAINING PROCESSING     │
└───────────────────────────┘
            │
            ▼
┌───────────────────────────┐
│  SETTING OF PAPER SHEET SIZE │── S303
└───────────────────────────┘
            │
            ▼
         ╱─────────╲  S304
        ╱  SETTING OF ╲
       ╱ PAPER SHEET SIZE ╲────── NO
       ╲  SUCCEEDED?      ╱
        ╲───────────────╱
            │ YES
            ▼
┌───────────────────────────┐
│  MINUTELY MOVE READING UNIT │── S603
└───────────────────────────┘
            │
            ▼
┌───────────────────────────┐
│   MOVE READING UNIT TO      │── S306
│   SECOND READING POSITION   │
└───────────────────────────┘
            │
            ▼
┌───────────────────────────┐
│ BODY POSITION INFORMATION  │── S307
│   OBTAINING PROCESSING     │
└───────────────────────────┘
            │
            ▼
┌───────────────────────────┐
│  SETTING OF RESOLUTION OF   │── S308
│   IMAGE TO BE RECORDED      │
└───────────────────────────┘
            │
            ▼
         ╱─────────╲  S309
        ╱ SETTING OF  ╲
       ╱ RESOLUTION OF  ╲
      ╱ IMAGE TO BE      ╲────── NO
      ╲ RECORDED         ╱
       ╲ SUCCEEDED?     ╱
        ╲─────────────╱
            │ YES
            ▼
┌───────────────────────────┐
│  MINUTELY MOVE READING UNIT │── S604
└───────────────────────────┘
            │
            ▼
        ( END )
```

FIG. 12

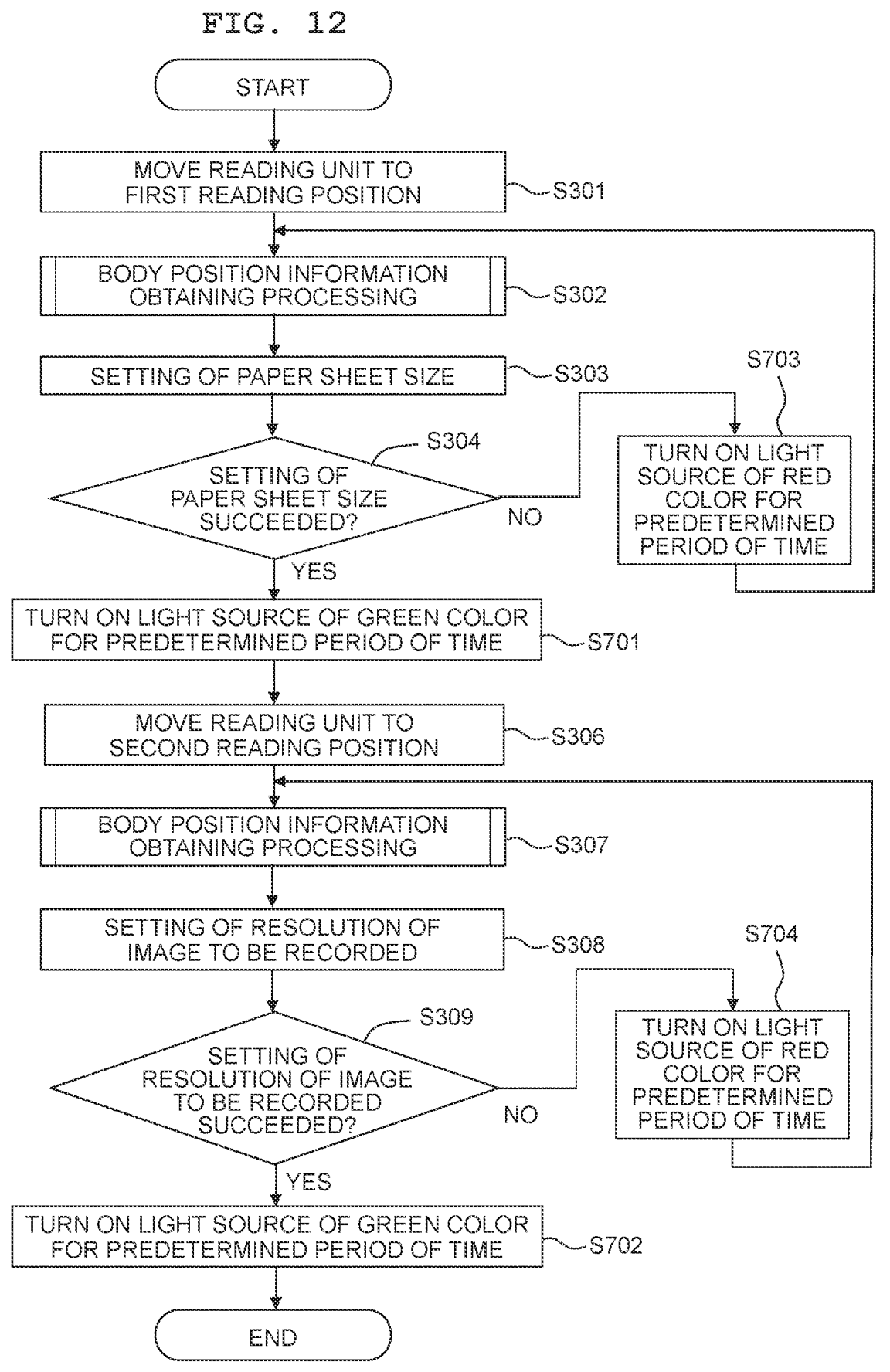

```
                    ┌──────────────┐
                    │    START     │
                    └──────┬───────┘
                           │
          ┌────────────────▼────────────────┐
          │      MOVE READING UNIT TO        │──S301
          │      FIRST READING POSITION      │
          └────────────────┬────────────────┘
                           │
          ┌────────────────▼────────────────┐
          │   BODY POSITION INFORMATION      │──S302
          │      OBTAINING PROCESSING        │
          └────────────────┬────────────────┘
                           │                              S703
          ┌────────────────▼────────────────┐
          │   SETTING OF PAPER SHEET SIZE    │──S303
          └────────────────┬────────────────┘
                           │                         ┌──────────────────┐
                 ┌─────────▼─────────┐               │   TURN ON LIGHT   │
                 │   SETTING OF       │              │  SOURCE OF RED    │
                 │  PAPER SHEET SIZE  │──S304   NO   │   COLOR FOR       │
                 │   SUCCEEDED?       │────────────▶ │  PREDETERMINED    │
                 └─────────┬─────────┘               │  PERIOD OF TIME   │
                        YES│                          └──────────────────┘
          ┌────────────────▼────────────────┐
          │ TURN ON LIGHT SOURCE OF GREEN    │──S701
          │ COLOR FOR PREDETERMINED PERIOD   │
          │           OF TIME                │
          └────────────────┬────────────────┘
                           │
          ┌────────────────▼────────────────┐
          │      MOVE READING UNIT TO        │──S306
          │     SECOND READING POSITION      │
          └────────────────┬────────────────┘
                           │
          ┌────────────────▼────────────────┐
          │   BODY POSITION INFORMATION      │──S307
          │      OBTAINING PROCESSING        │
          └────────────────┬────────────────┘
                           │                              S704
          ┌────────────────▼────────────────┐
          │    SETTING OF RESOLUTION OF      │──S308
          │     IMAGE TO BE RECORDED         │
          └────────────────┬────────────────┘
                           │                         ┌──────────────────┐
                 ┌─────────▼─────────┐               │   TURN ON LIGHT   │
                 │   SETTING OF       │              │  SOURCE OF RED    │
                 │ RESOLUTION OF IMAGE│──S309   NO   │   COLOR FOR       │
                 │ TO BE RECORDED     │────────────▶ │  PREDETERMINED    │
                 │   SUCCEEDED?       │              │  PERIOD OF TIME   │
                 └─────────┬─────────┘               └──────────────────┘
                        YES│
          ┌────────────────▼────────────────┐
          │ TURN ON LIGHT SOURCE OF GREEN    │──S702
          │ COLOR FOR PREDETERMINED PERIOD   │
          │           OF TIME                │
          └────────────────┬────────────────┘
                           │
                    ┌──────▼───────┐
                    │     END      │
                    └──────────────┘
```

START

MOVE READING UNIT TO
READING POSITION — S801

BODY POSITION INFORMATION
OBTAINING PROCESSING — S302

SETTING OF PAPER SHEET SIZE — S303

SETTING OF
PAPER SHEET SIZE
SUCCEEDED? — S304

NO

YES

FLASH LIGHT SOURCES OF THREE COLORS
FOR PREDETERMINED PERIOD OF TIME — S305

TO STEP S307

|  | PAPER SHEET SIZE | KIND OF PAPER SHEET | RESOLUTION | ... |
|---|---|---|---|---|
| USER SETTING 1 | A4 | PLAIN PAPER SHEET | 200dpi | ... |
| USER SETTING 2 | A4 | GLOSSY PAPER SHEET | 300dpi | ... |
| USER SETTING 3 | A5 | PLAIN PAPER SHEET | 100dpi | ... |

APPARATUS PROVIDED WITH READING UNIT TO READ MANUSCRIPT ON READING SURFACE AND TO CHANGE SETTINGS BASED ON READING

REFERENCE TO RELATED APPLICATIONS

This application claims priority from Japanese Patent Application No. 2022-152252 filed on Sep. 26, 2022. The entire content of the priority application is incorporated herein by reference.

BACKGROUND ART

As an example of an apparatus provided with a reading unit configured to read a manuscript on a reading surface, there is a publicly known multifunction peripheral capable of recording an image and reading an image. In this multifunction peripheral, an image recorded on a paper sheet placed on a placement surface of a manuscript stand can be read by the reading unit. Further, in this multifunction peripheral, three displaying parts and three setting members are provided on an end in a scanning direction of the placement surface. Each of the three displaying parts includes a plurality of displays. Each of the displays indicates a processing condition in the multifunction peripheral. Each of the three setting members corresponds to one of the three displaying parts, and is configured to be movable to any position in the plurality of displays of one of the three displaying parts corresponding thereto. Further, in this multifunction peripheral, a reading operation is performed by the reading unit to thereby obtain position information of the positions of the three setting members, and processing conditions corresponding to the obtained positions of the three setting members are set as processing conditions of the multifunction peripheral.

DESCRIPTION

In this multifunction peripheral, it is necessary to provide the setting members on the multifunction peripheral, and it is necessary to change the positions of the setting members in order to change the processing conditions. However, an operation of moving the setting members is complicated.

An object of the present disclosure is to provide an apparatus provided with a reading unit configured to perform the setting(s) by utilizing a reading result of the reading unit by a simpler operation.

According to an aspect of the present disclosure, there is provided an apparatus comprising: a reading surface; a reading unit configured to read a manuscript on the reading surface; and a controller, wherein the controller is configured to: cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation.

According to another aspect of the present disclosure, there is provided an apparatus comprising: a reading surface extending in a first direction; a reading unit configured to read a manuscript on the reading surface; and a controller, wherein the reading unit has: a light emitting part extending in the first direction and configured to emit light toward the reading surface; and a plurality of light receiving parts which are arranged side by side in the first direction and each of which is configured to output a signal having a value corresponding to a characteristic of the light received by each of the light receiving parts, and the controller is configured to: cause the light emitting part to emit the light; obtain reading data based on the value of the signal outputted from each of the light receiving parts; obtain position information as information of a position of a setting member which is arranged by a user on the reading surface after the controller has started causing the light emitting part to emit the light, based on a position in the first direction of a light receiving part, of the light receiving parts, in which the reading data indicates that the value of the signal outputted therefrom has changed by not less than a predetermined amount from the value of the signal at a point of time at which the controller has started causing the light emitting part to emit the light; and perform a setting of the apparatus or of a peripheral device configured to communicate with the apparatus, based on the position information.

According to the present disclosure, it is possible of perform the setting of the apparatus provided with the reading unit or the setting of the peripheral device which is connected to the apparatus provided with the reading unit so that the communicating can be performed therebetween, by a simple operation of reading a part of an object positioned at a position, on the reading surface, corresponding to a setting desired by the user.

FIG. 4A is a view of FIG. 3 as seen from a direction of an arrow IV, and FIG. 4B is a view of FIG. 4A in a state that a cover is opened.

Figure 10A:
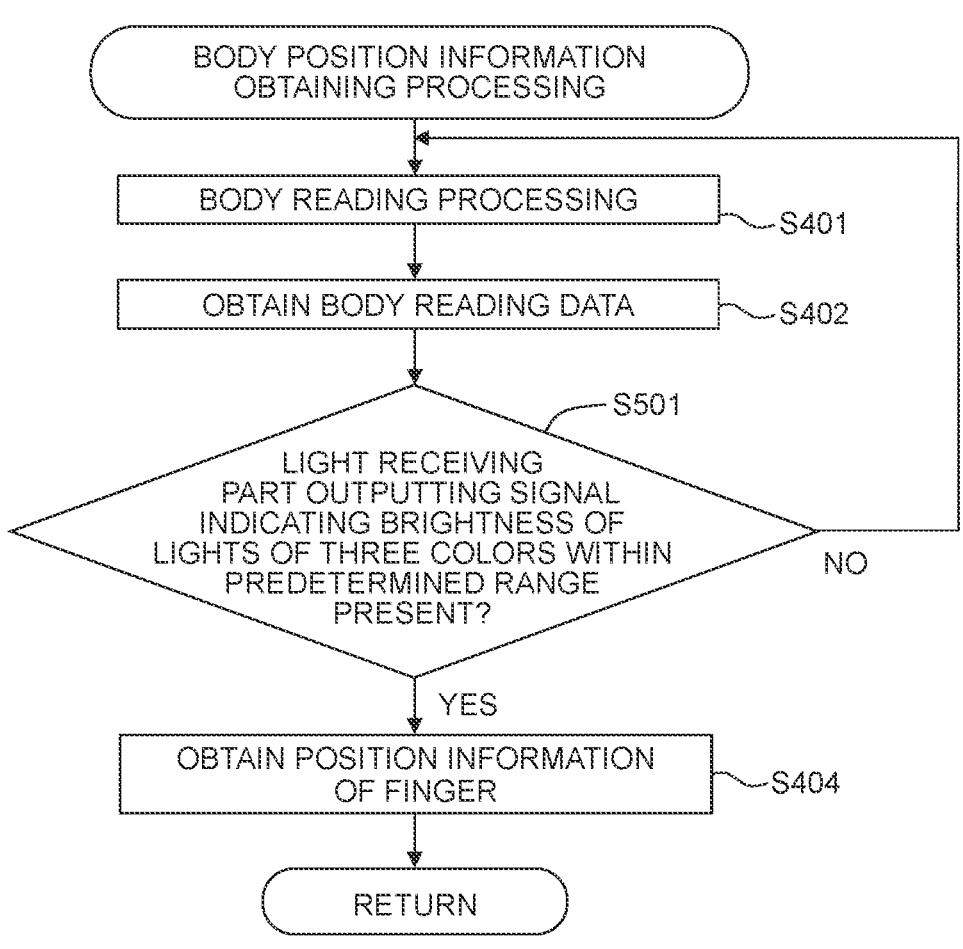
Figure 10B:
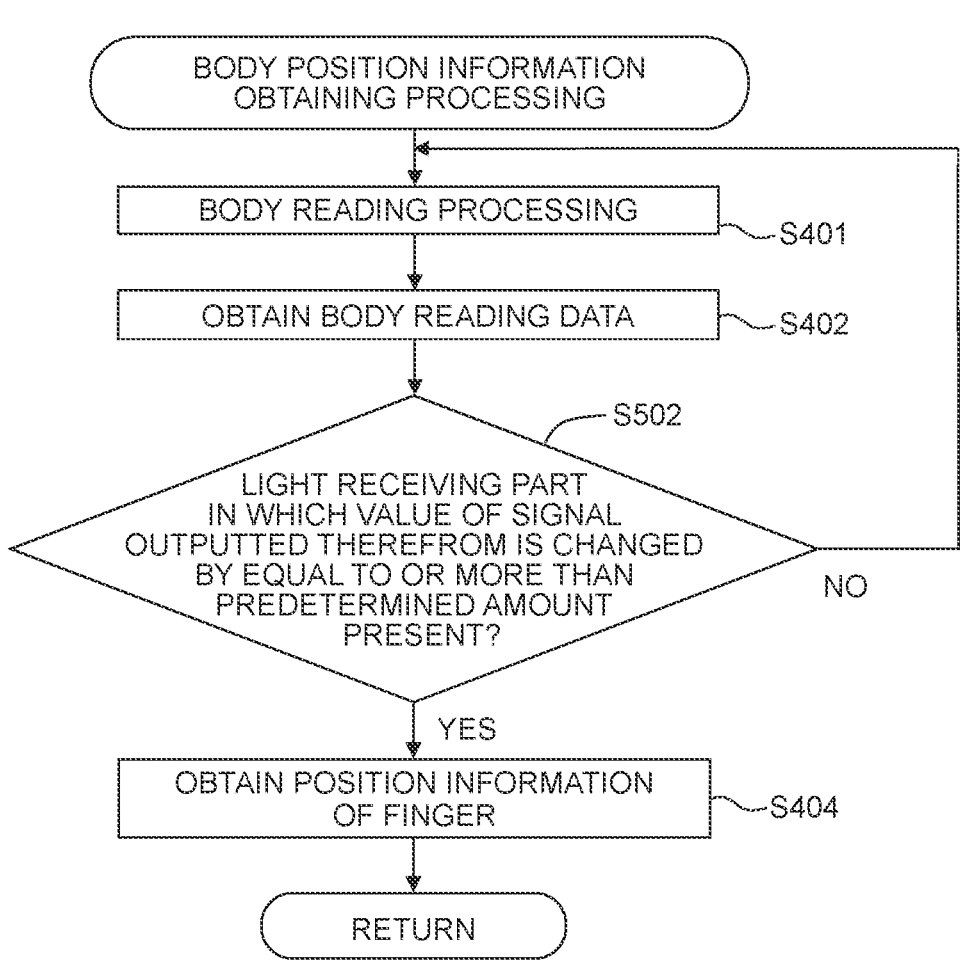
Figure 10C:
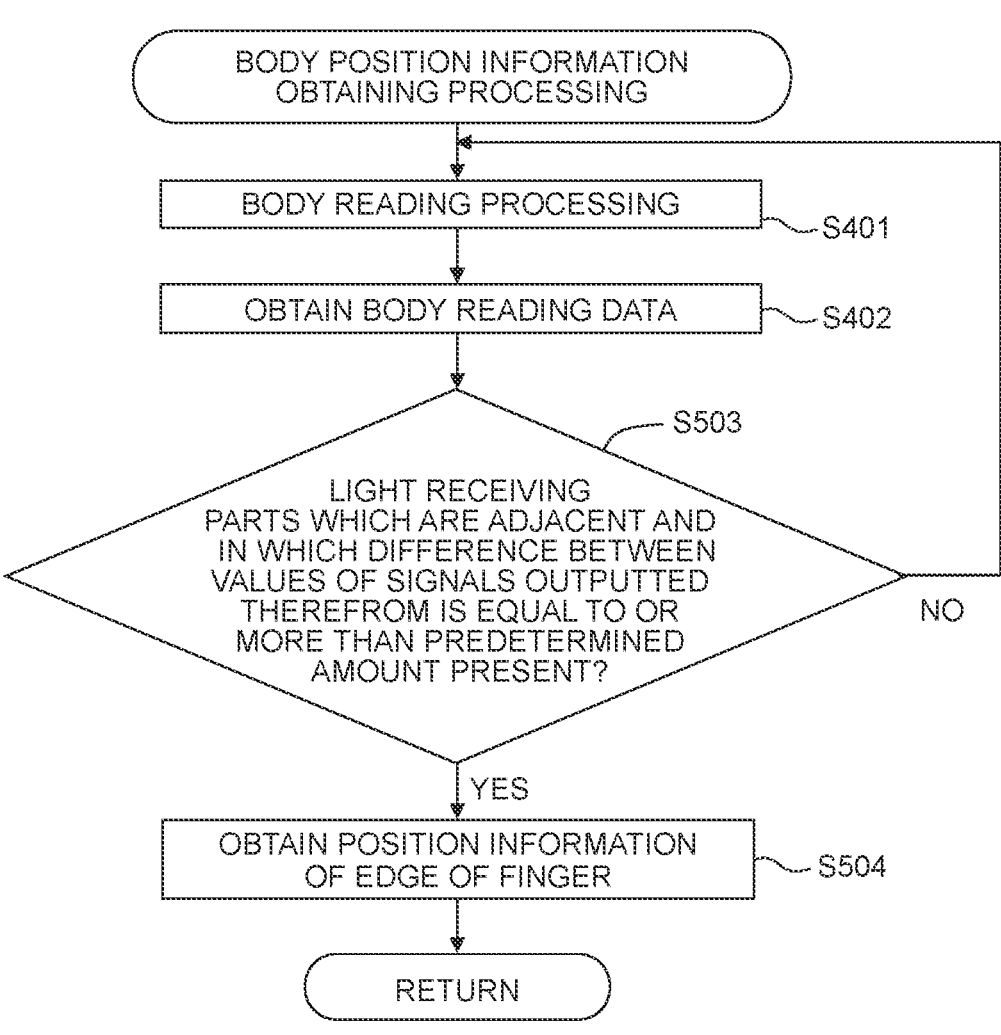

FIG. 10A is a flow chart indicating the flow of the body position information obtaining processing in an example wherein a position of a finger of a user is obtained based on a brightness of a light received by a light receiving part, FIG. 10B is a flow chart indicating the flow of the body position information obtaining processing in an example wherein the position of the finger of the user is obtained based on that a value of a signal outputted by the light receiving part is changed by a not less than a predetermined amount; and FIG. 10C is a flow chart indicating the flow of the body position information obtaining processing in an example wherein a position of an edge of the finger of the user is obtained.

Figure 11A:
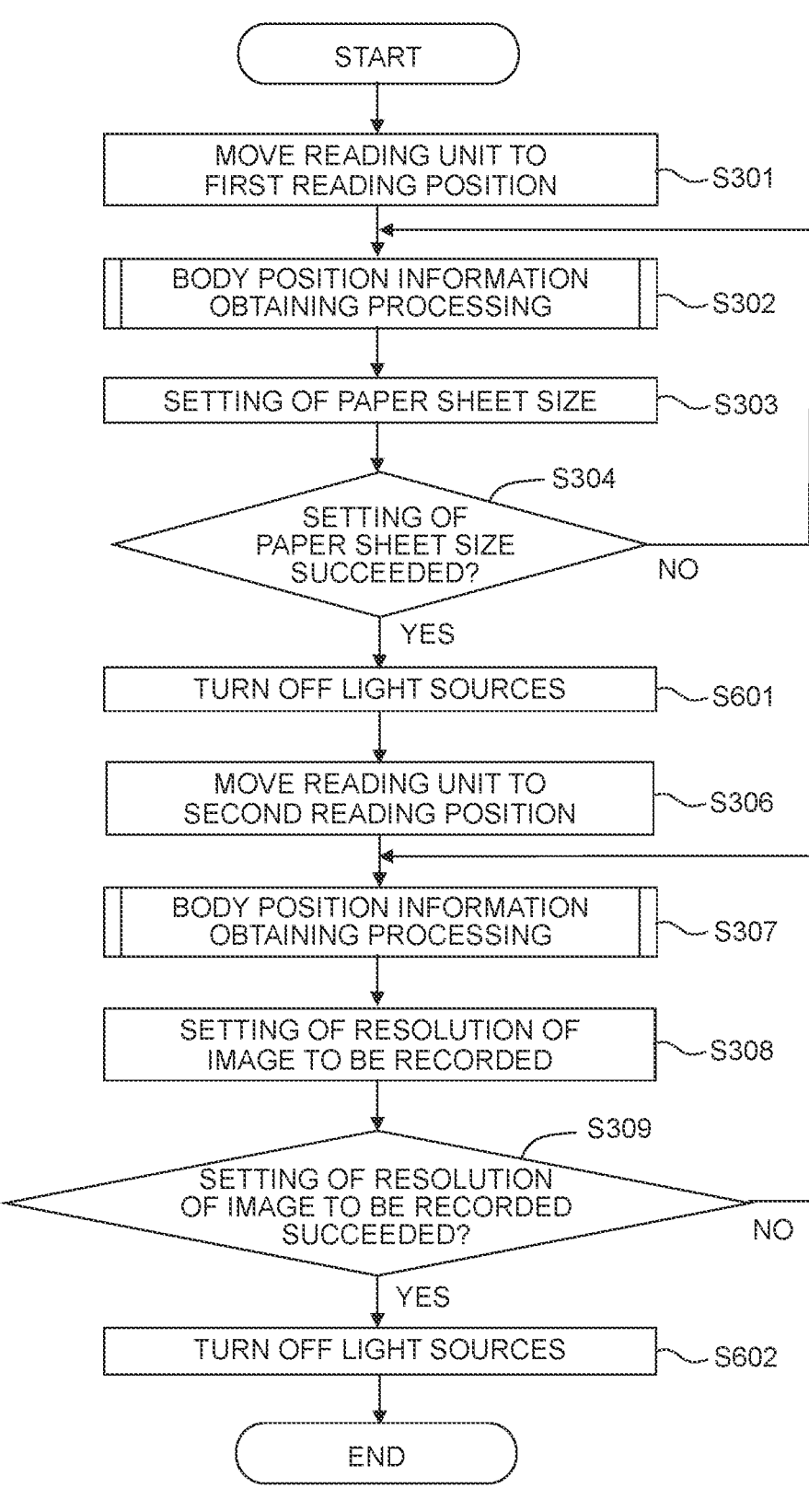

FIG. 11A is a flow chart indicating the flow of a processing in a case that a setting instruction signal is received in an example wherein a light source is turned off in a case that a setting is performed successfully (succeeds), and FIG. 11B is a flow chart indicating the flow of a processing in a case that the setting instruction signal is received in an example wherein a reading unit is moved minutely in a case that the setting succeeds.

FIG. 12 is a flow chart indicating the flow of a processing in a case that the setting instruction signal is received in an example wherein a color of a light, of a light source which is to be lighted (turned on), is made to be different between a case that the setting succeeds and in a case that the setting is performed unsuccessfully (fails).

Figure 5A:
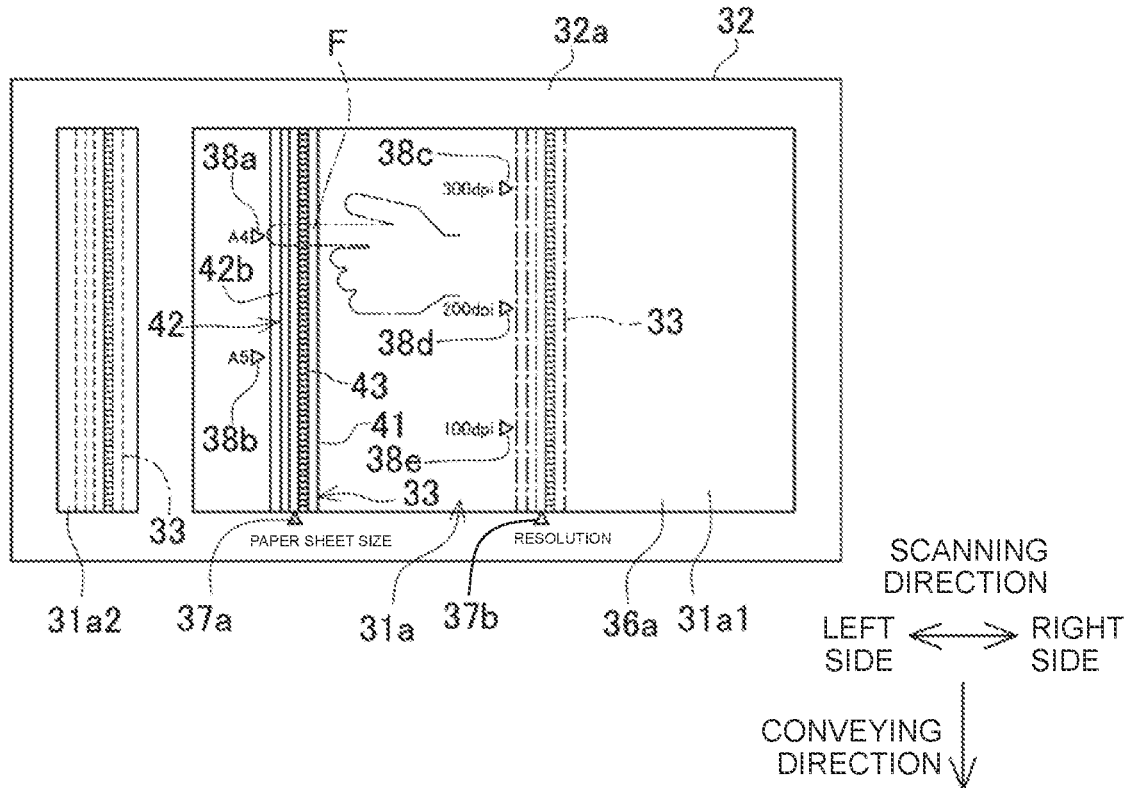
FIG. 5A is a view of a placement stand as seen from thereabove.
Figure 13A:
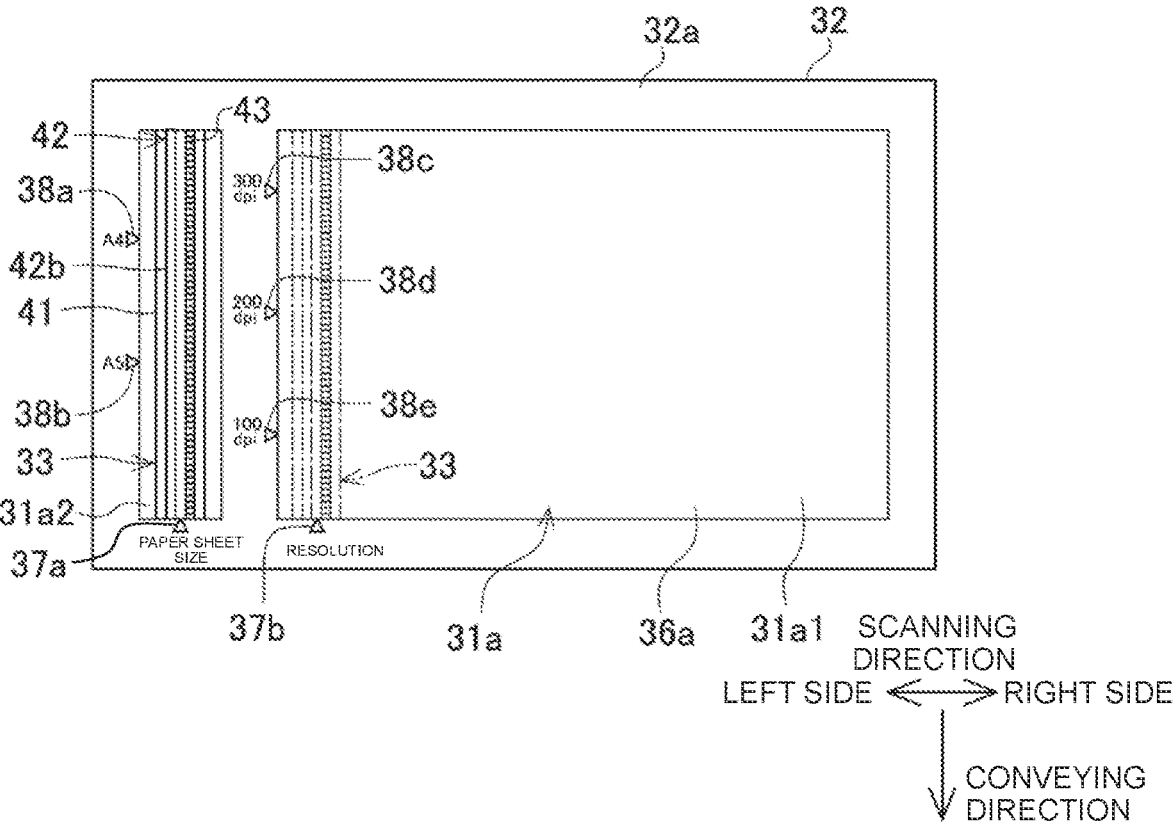
Figure 13B:
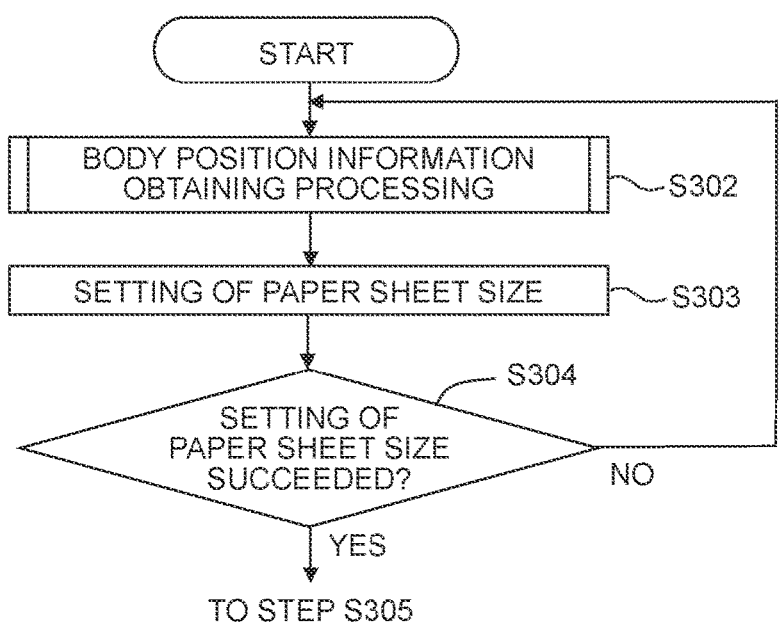

FIG. 13A is a view corresponding to FIG. 5A in an example wherein a standby position and a first reading position are a same position, and FIG. 13B is a flow chart indicating the flow of a processing in a case that the setting instruction signal is received in this example.

Figures 14A, 14B:
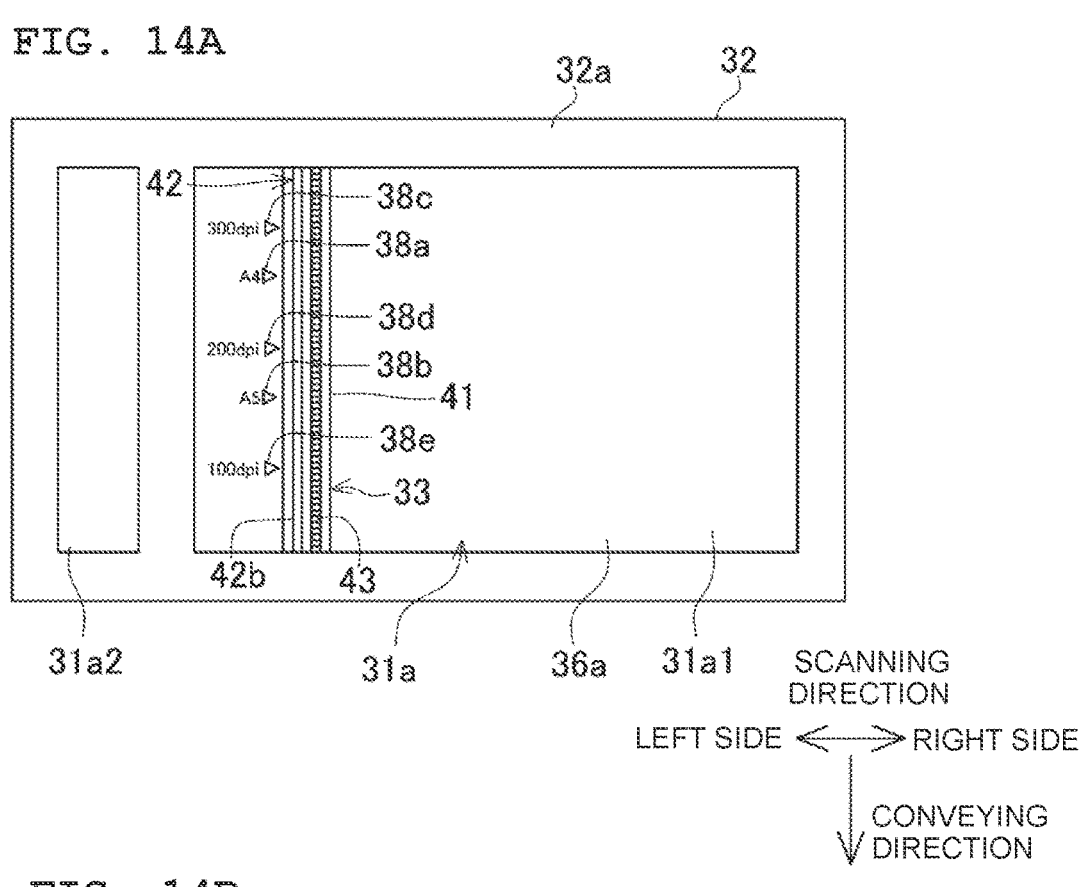

FIG. 14A is a view corresponding to FIG. 5A in an example wherein a position of the reading unit is same in a case of setting a paper sheet size and in a case of setting the resolution of an image to be recorded, and FIG. 14B is a flow chart indicating the flow of a processing in a case that the setting instruction signal is received in this example.

Figures 15A, 15B:
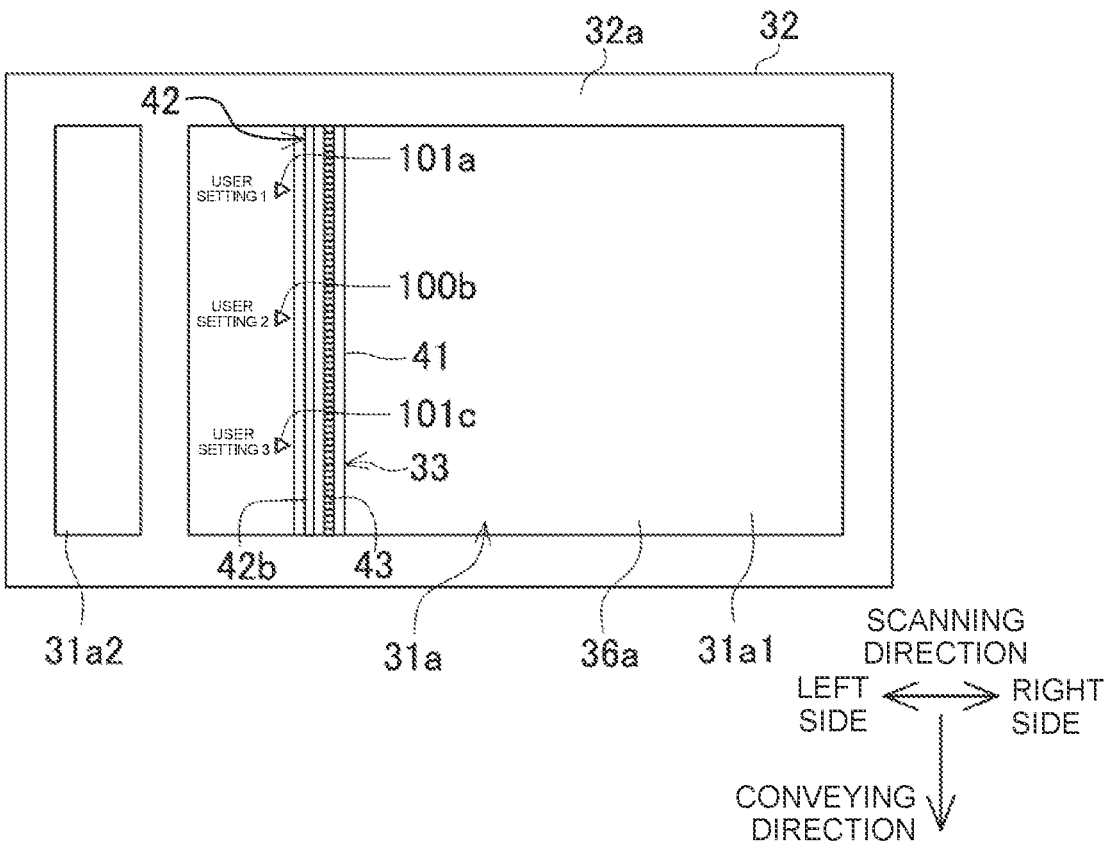
Figure 15C:
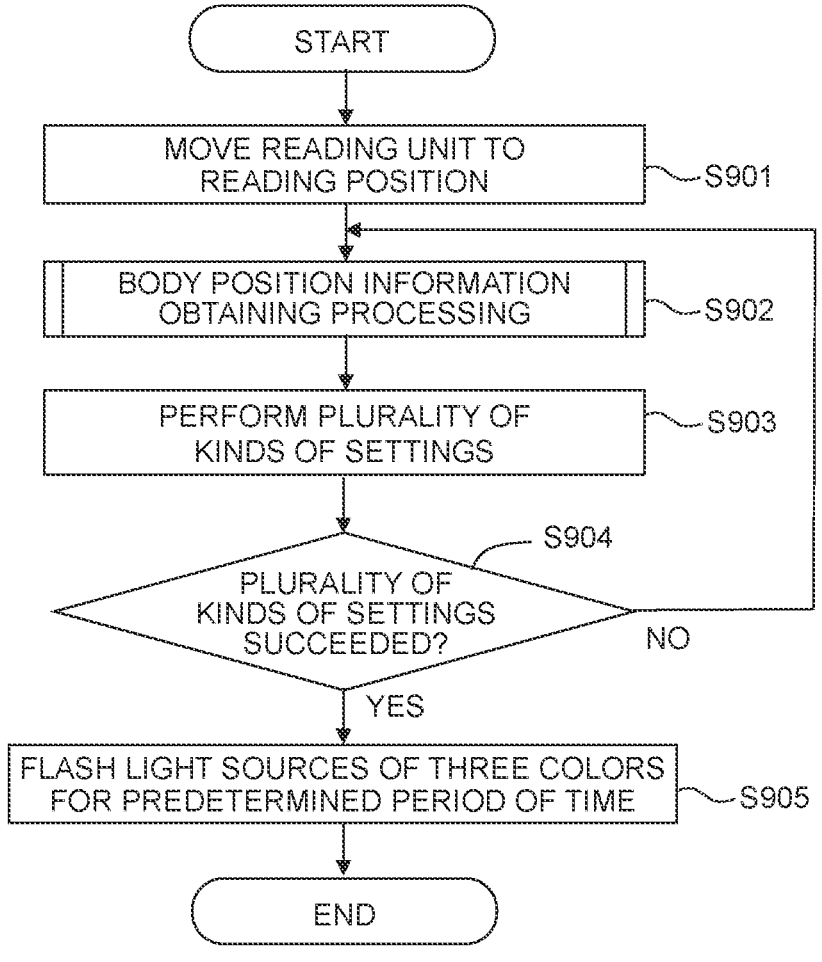

FIG. 15A is a view corresponding to FIG. 5A in an example wherein a plurality of kinds of settings can be performed at once, in accordance with a user setting which has been previously performed, FIG. 15B is a view for explaining an example of the user setting, and FIG. 15C is a flow chart indicating the flow of a processing in a case that the setting instruction signal is received in this example.

Figure 16:
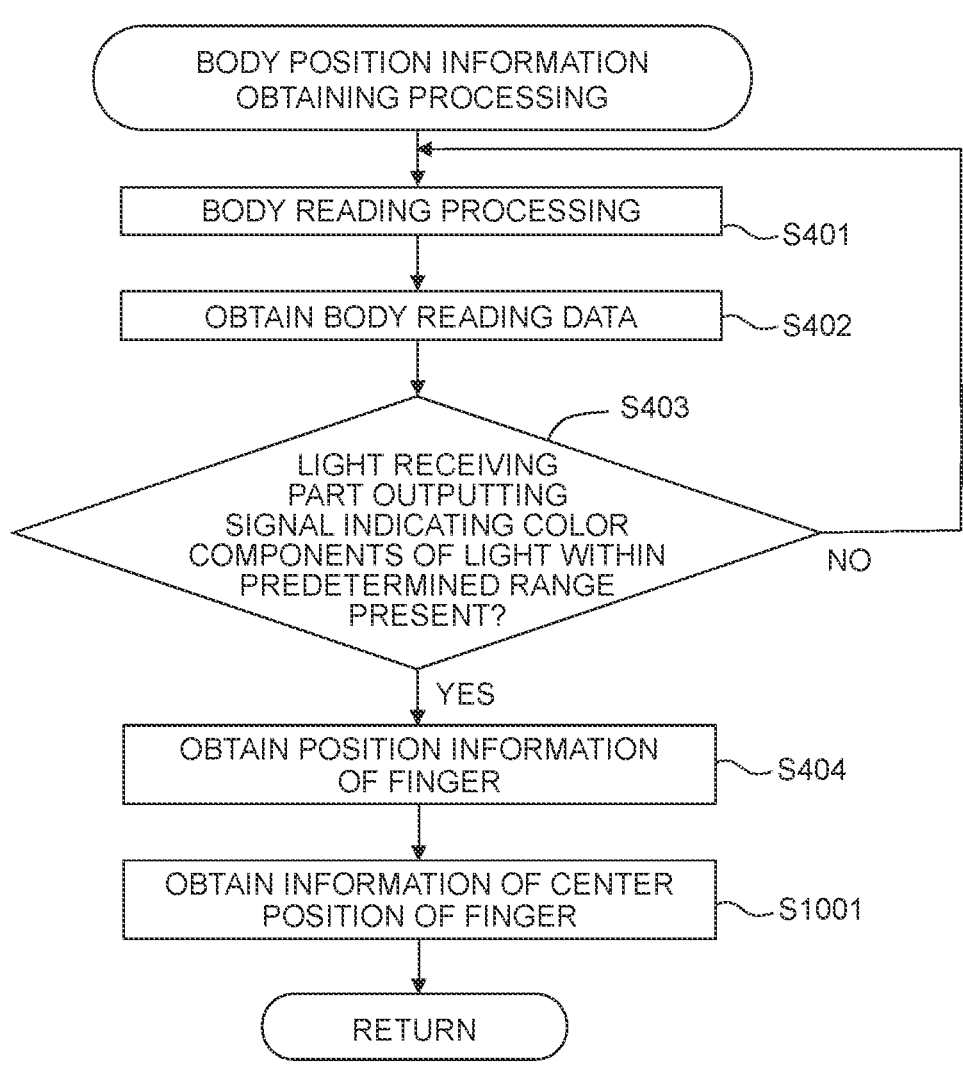

FIG. 16 is a flow chart indicating the flow of the body position information obtaining processing in an example wherein the setting is performed based on a central portion in a conveying direction of the finger of the user.

Figure 17A:
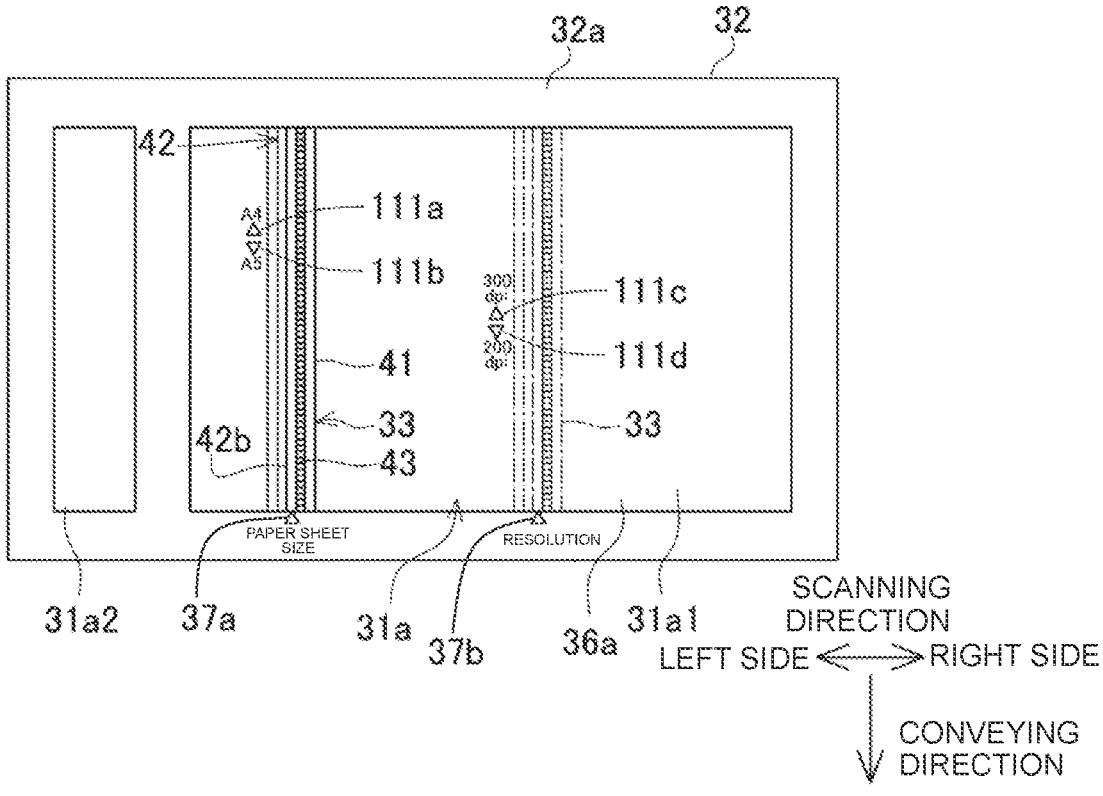
Figure 17B:
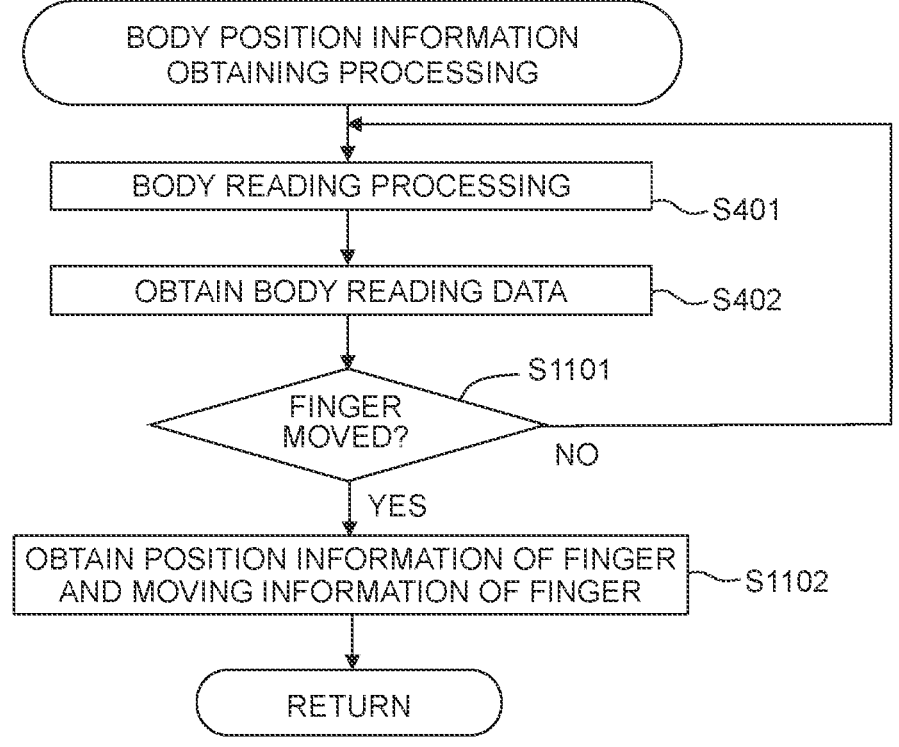

FIG. 17A is a view corresponding to FIG. 5A and depicting an example wherein the setting is performed in accordance with a moving direction of the finger of the user, and FIG. 17B is a flow chart indicating the flow of the body position information obtaining processing in this example.

Figure 18A:
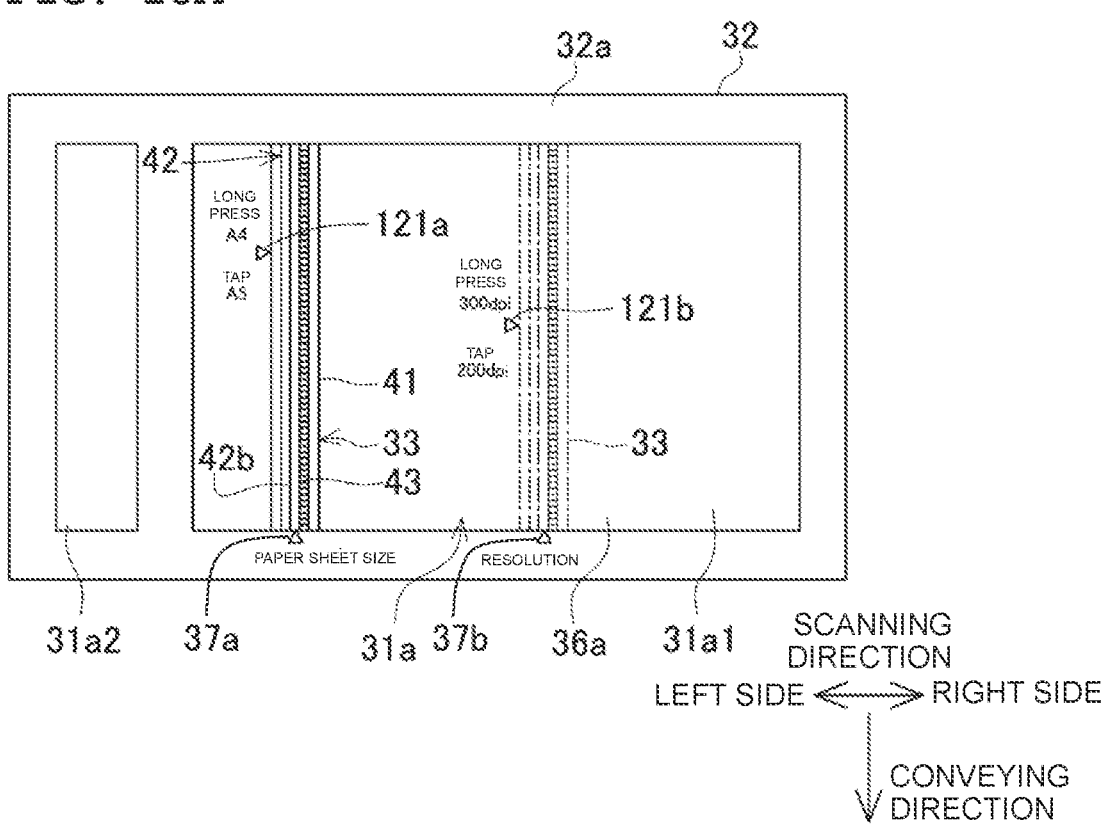
Figure 18B:
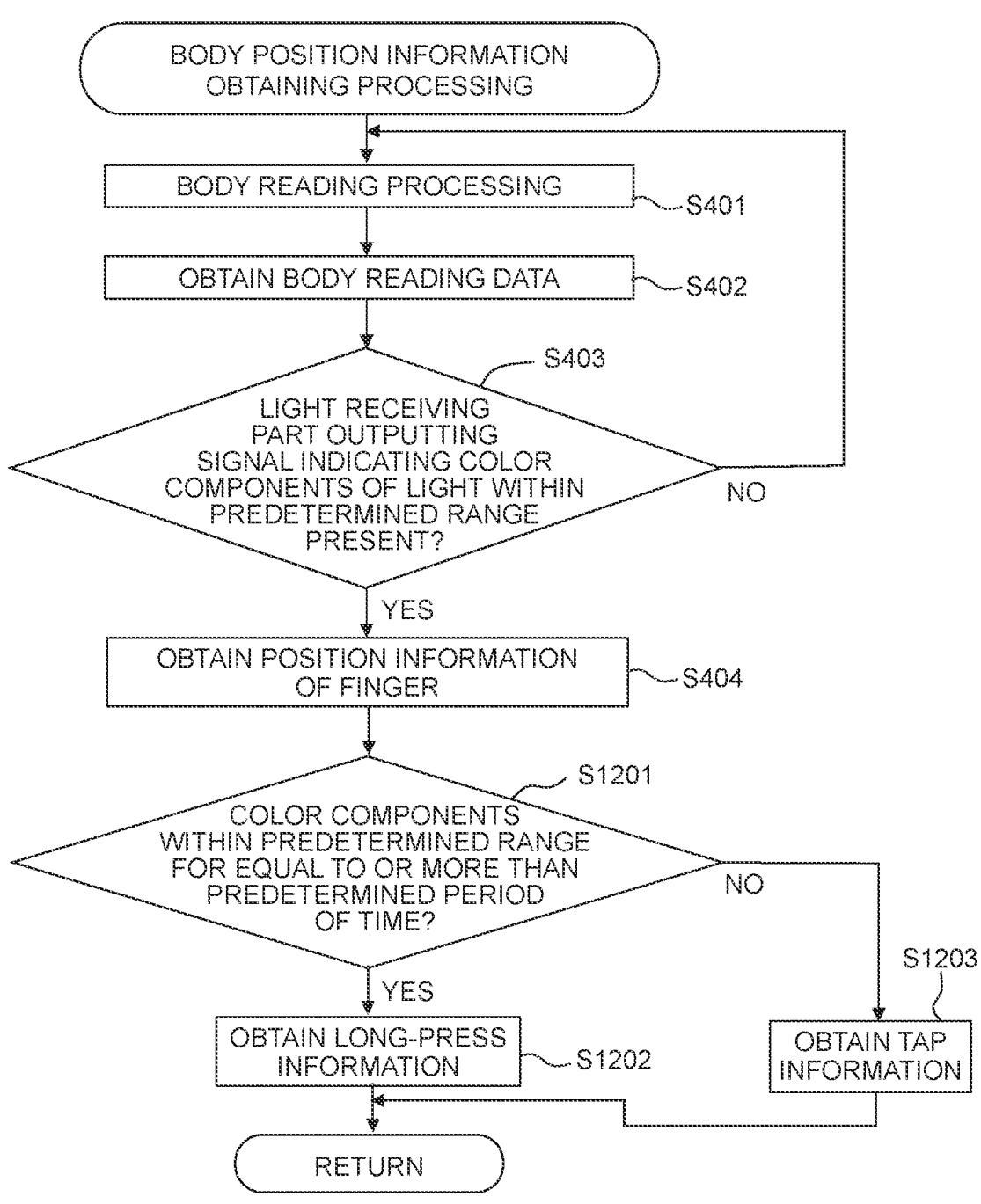

FIG. 18A is view corresponding to FIG. 5A and depicting an example wherein the setting is performed in accordance with a period of time during which a state that the finger of the user is placed on the placement surface is continued, and FIG. 18B is a flow chart indicating the flow of the body position information obtaining processing in this example.

Figure 19A:
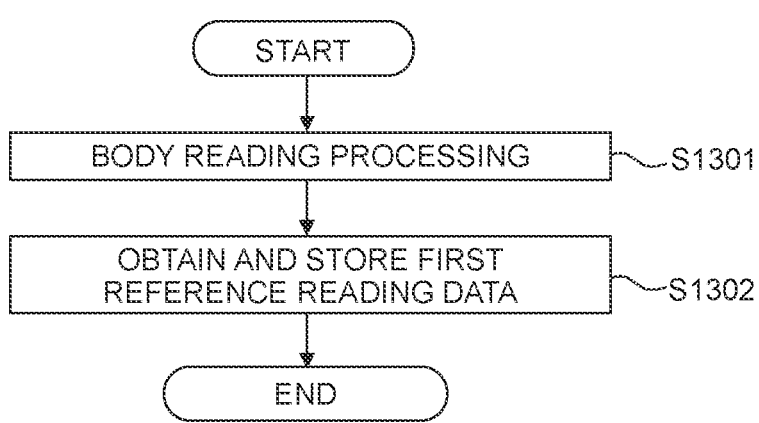
Figure 19B:
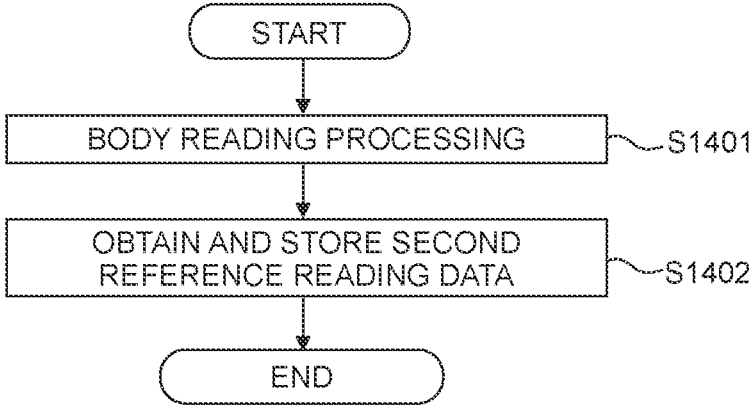
Figure 19C:
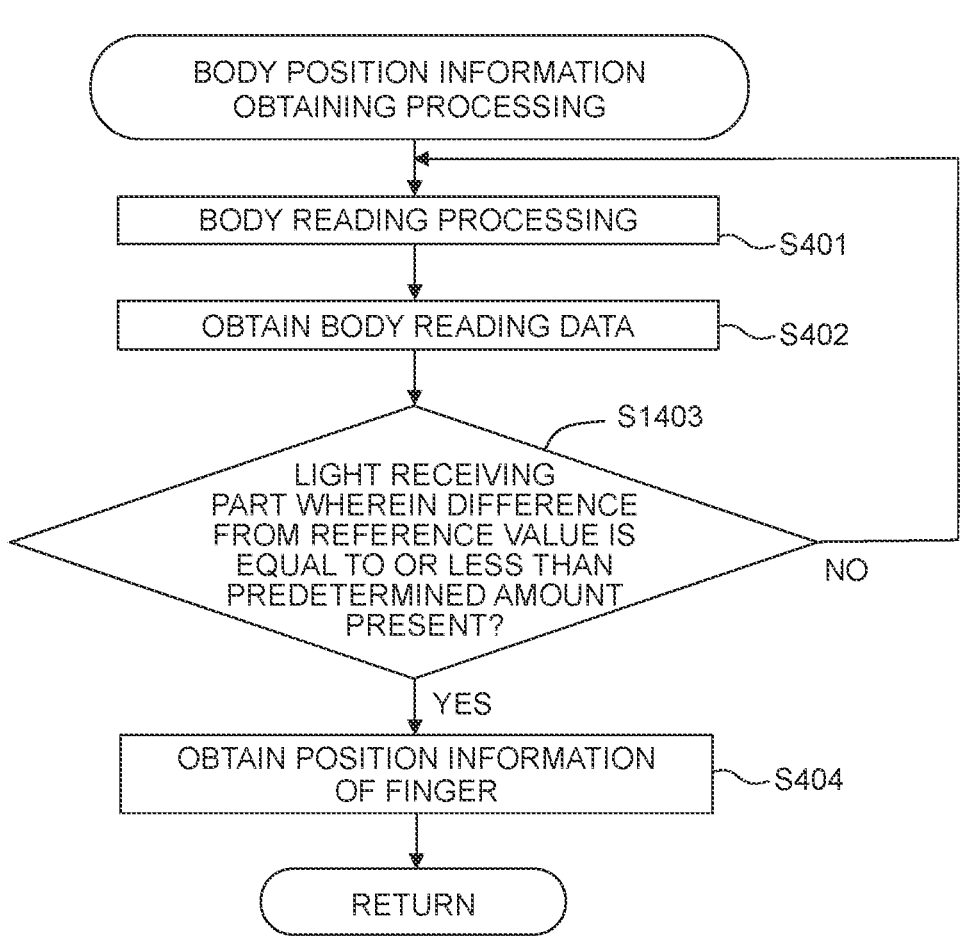

FIG. 19A is a flow chart indicating the flow of a processing for obtaining first reference reading data in an example wherein the setting is performed based on body reading data and the first reference reading data, FIG. 19B is a flow chart indicating the flow of a processing for obtaining second reference reading data in an example wherein the setting is performed based on the body reading data and the second reference reading data, and FIG. 19C is a flow chart indicating the flow of the body position information obtaining processing in the example wherein the setting is made based on the body reading data and the second reference reading data.

In the following, an embodiment of the present disclosure will be explained.

<Overall Configuration of the Multifunction Peripheral>

Figure 1:
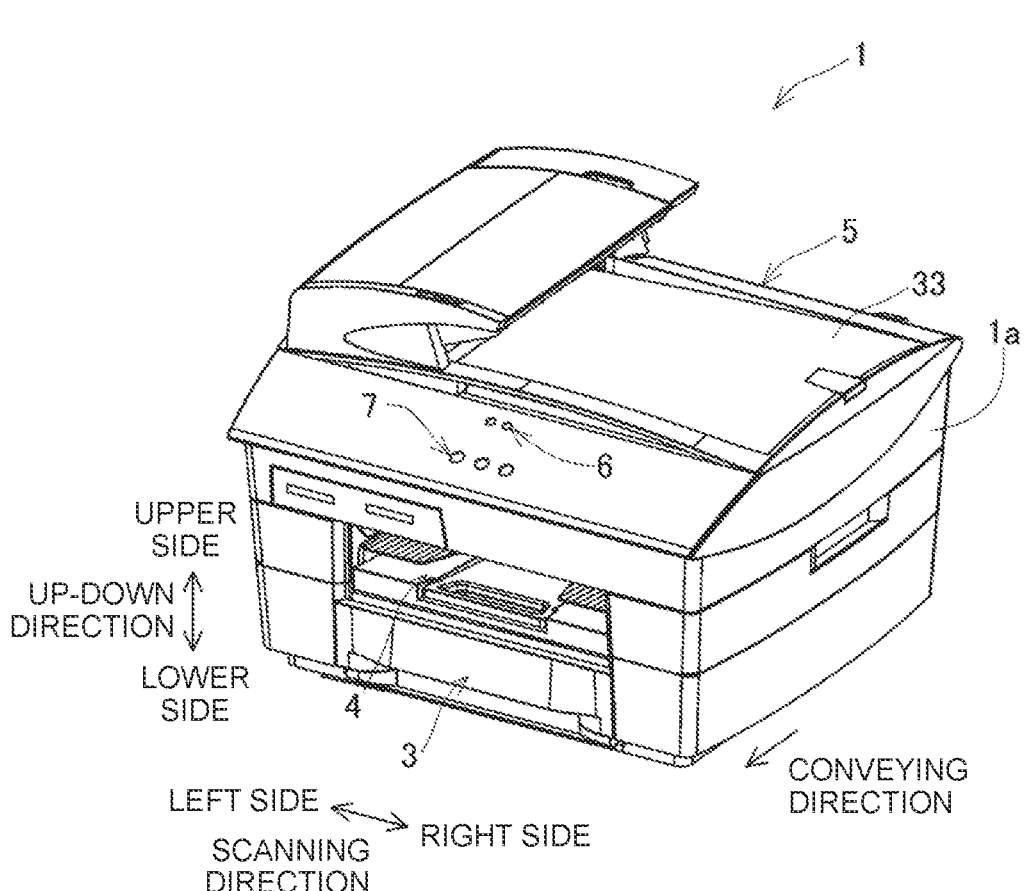
FIG. 1 is a view schematically depicting the configuration of a multifunction peripheral of an embodiment of the present disclosure.
Figure 2:
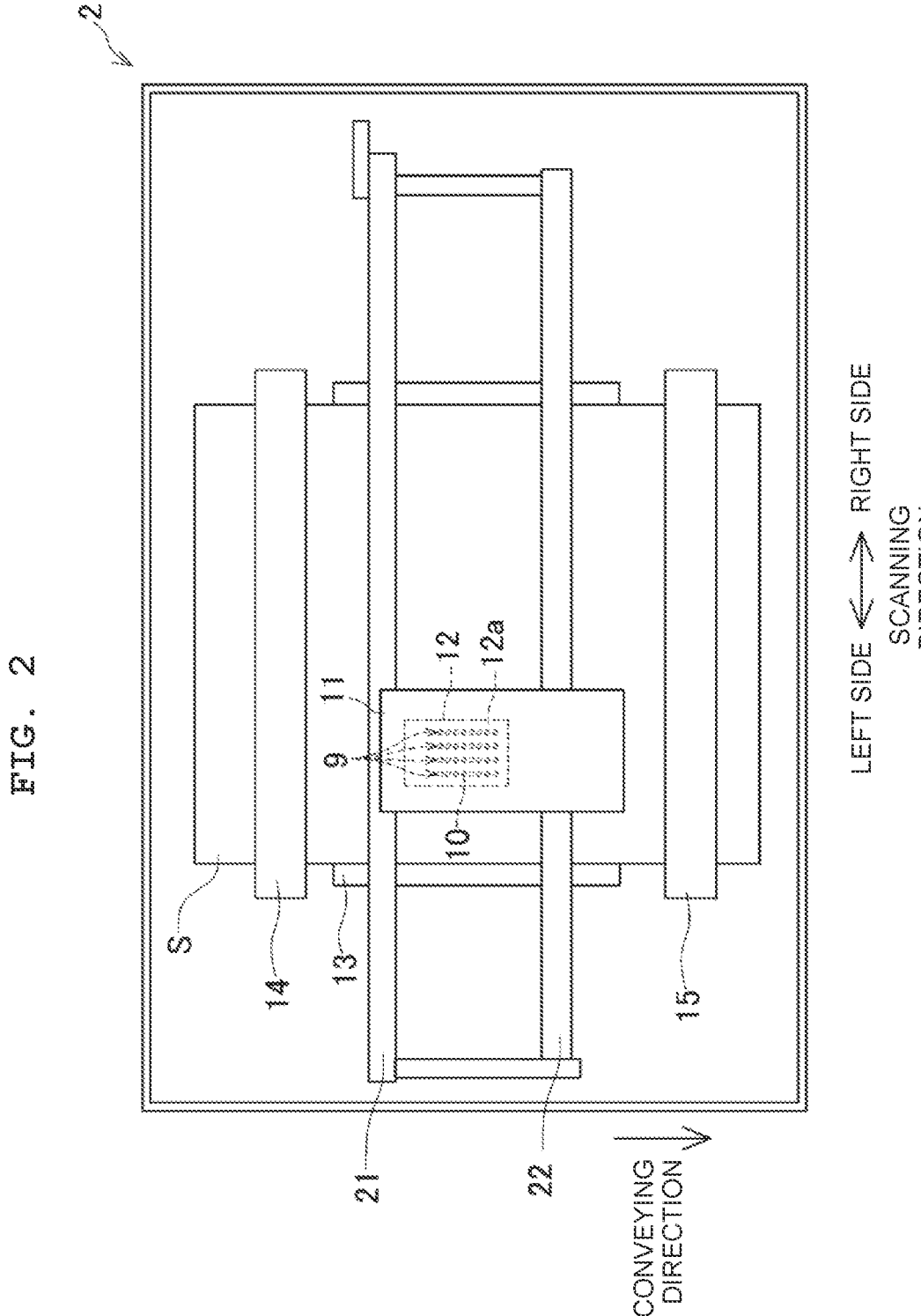
FIG. 2 is a view schematically depicting the configuration of a recording unit.
Figure 3:
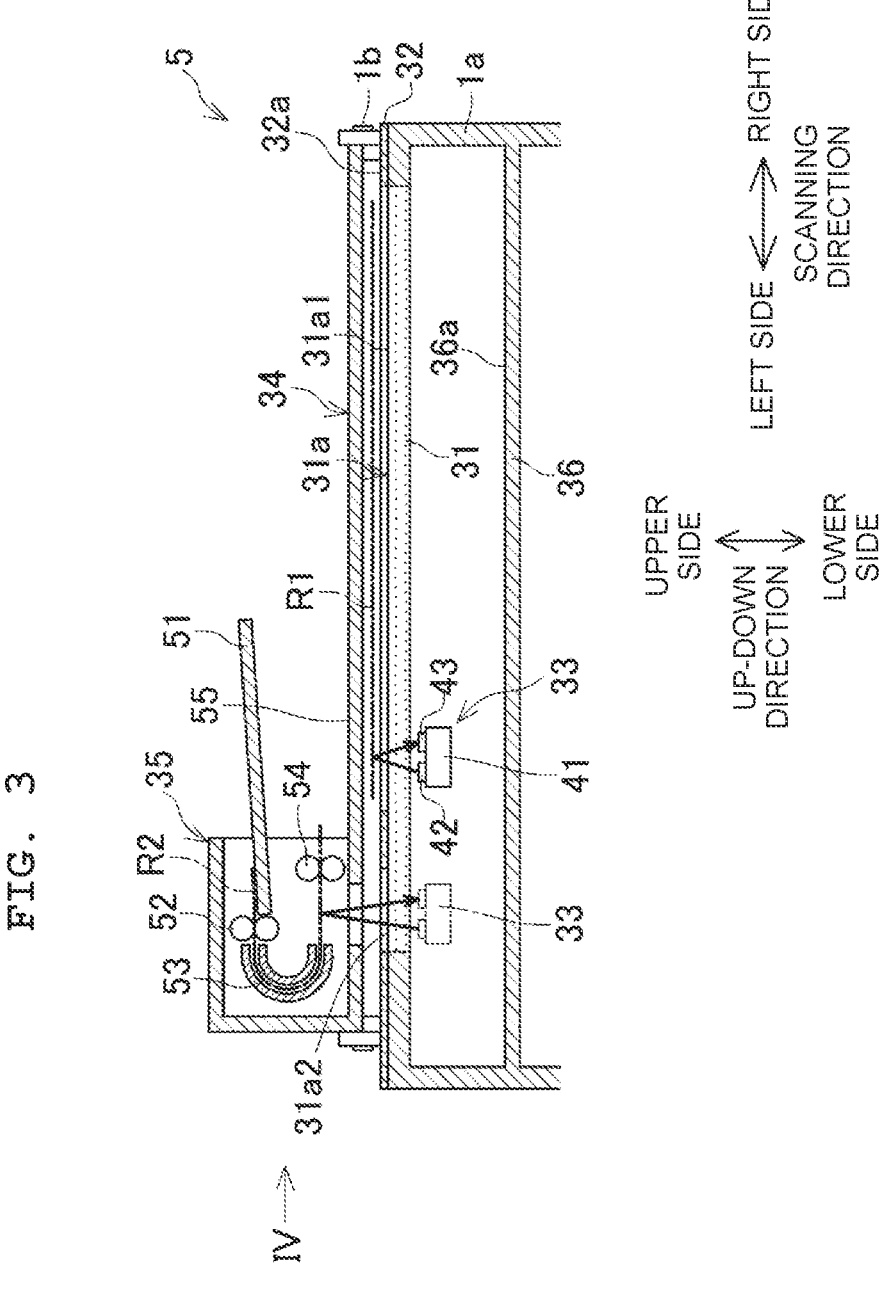
FIG. 3 is a view schematically depicting the configuration of a reading part.

As depicted in FIG. 1, a multifunction peripheral 1 according to the present embodiment is provided with a recording unit 2 which is depicted in FIG. 2, a feeding part 3, a discharging part 4, a reading part 5, a displaying part 6 and an operating part 7. Note that in the present embodiment, the multifunction peripheral 1 corresponds to an "apparatus provided with a reading unit", an "image recording apparatus" and an "image reading apparatus" of the present disclosure.

The recording unit 2 is provided in the inside of the multifunction peripheral 1, and is configured to perform a recording of an image with respect to a recording paper sheet (recording paper, recording sheet) S. The recording unit 2 will be explained in detail later on. The feeding part 3 is configured to feed the recording paper sheet S to the recording unit 2. A recording paper sheet S having the recording performed thereon by the recording unit 2 is discharged to the discharging part 4. The reading part 5 is configured to perform reading of an image. The reading part 5 will be explained in detail later on. The displaying part 6 is an LED lamp, etc., and is configured to be lighted (to be turned on), to flash (to be turned on and off), and to be turned off, in accordance with a state, etc., of the multifunction peripheral 1. The operating part 7 is a button, etc., via which a user performs an operation with respect to the multifunction peripheral 1.

<Recording Unit>

As depicted in FIG. 2, the recording unit 2 is provided with a first carriage 11, an ink-jet head 12, a platen 13 and conveying rollers 14 and 15.

The first carriage 11 is supported by two guide rails 21 and 22 extending in a scanning direction which is along a horizontal plane. Note that in the following, the explanation will be given while defining the right side and the left side of the scanning direction as depicted in FIGS. 1 and 2. Further, in the present embodiment, the scanning direction corresponds to a "second direction" of the present disclosure. The first carriage 11 is connected to a first carriage motor 86 depicted in FIG. 6, via a non-illustrated belt, etc. In a case that the first carriage motor 86 is driven, the first carriage 11 moves in the scanning direction along the guide rails 21 and 22.

The ink-jet head 12 is installed in the first carriage 11. The lower surface of the ink-jet head 12 is a nozzle surface 12a in which a plurality of nozzles 10 is formed, and the ink-jet head 12 ejects or discharges an ink from the plurality of nozzles 10. To provide a more detailed explanation, the plurality of nozzles 10 are aligned in a conveying direction which is along the horizontal plane and which is orthogonal to the scanning direction to thereby form a nozzle row (nozzle array) 9. Four pieces of the nozzle row 9 are arranged side by side in the scanning direction in the nozzle surface 12a. Black, yellow, cyan, and magenta inks are ejected in an order from a nozzle row 9 which is included in the four nozzle rows 9 and which is located on the right (rightmost) side in the scanning direction. Note that in the present embodiment, the conveying direction corresponds to a "first direction" of the present disclosure. Further, in the present embodiment, an up-down direction orthogonal to the scanning direction and the conveying direction corresponds to a "third direction" of the present disclosure.

The platen 13 is arranged at a location below the ink-jet head 12, and faces (is opposite to) the plurality of nozzles 10. The platen 13 extends over the entire length of the recording paper sheet S in the scanning direction, and supports the recording paper sheet S from therebelow. The conveying roller 14 is arranged on the upstream side in the conveying direction with respect to the ink-jet head 12 and the platen 13. The conveying roller 15 is arranged on the downstream side in the conveying direction with respect to the ink-jet head 12 and the platen 13. The conveying rollers 14 and 15 are connected to a conveying motor 87 depicted in FIG. 6 via a non-illustrated gear, etc. In a case that the conveying motor 87 is driven, the conveying rollers 14 and 15 are rotated to thereby convey the recording paper sheet S in the conveying direction.

Further, the recording unit 2 repeats a recording pass and a conveying operation to thereby record an image on a recording paper sheet S fed from the feeding part 3. In the recording pass, the ink-jet head 12 is caused to eject the ink(s) from the plurality of nozzles 10 toward the recording paper sheet S while driving the first carriage motor 86 so as to cause the first carriage 11 to move in the scanning direction. In the conveying operation, the conveying motor 87 is driven so as to cause the conveying rollers 14 and 15 to convey the recording paper sheet S in the conveyance direction. The recording paper sheet S on which the recording of the image is completed is discharged to the discharging part 4.

<Reading Part>

As depicted in FIG. 3, FIGS. 4A and 4B and FIG. 5A, the reading part 5 is provided with a placement stand 31, a frame part 32, a reading unit 33, a cover 34 and an ADF 35.

The placement stand 31 is a transparent member having a shape of rectangular parallelepiped and made of a material such as glass, etc., and is arranged at an upper part of the multifunction peripheral 1. An upper surface of the placement stand 31 is a reading surface 31a.

The frame part 32 is arranged so as to surround a periphery of the reading surface 31a. Further, the frame part 32 partitions the reading surface 31a into a placement surface 31a1 and an ADF reading surface 31a2 which is arranged at the left side in the scanning direction with respect to the placement surface 31a1.

The reading unit 33 is positioned at a location below the placement stand 31. The reading unit 33 has a second carriage 41, a light emitting part 42 and a plurality of light receiving parts 43.

Figure 6:
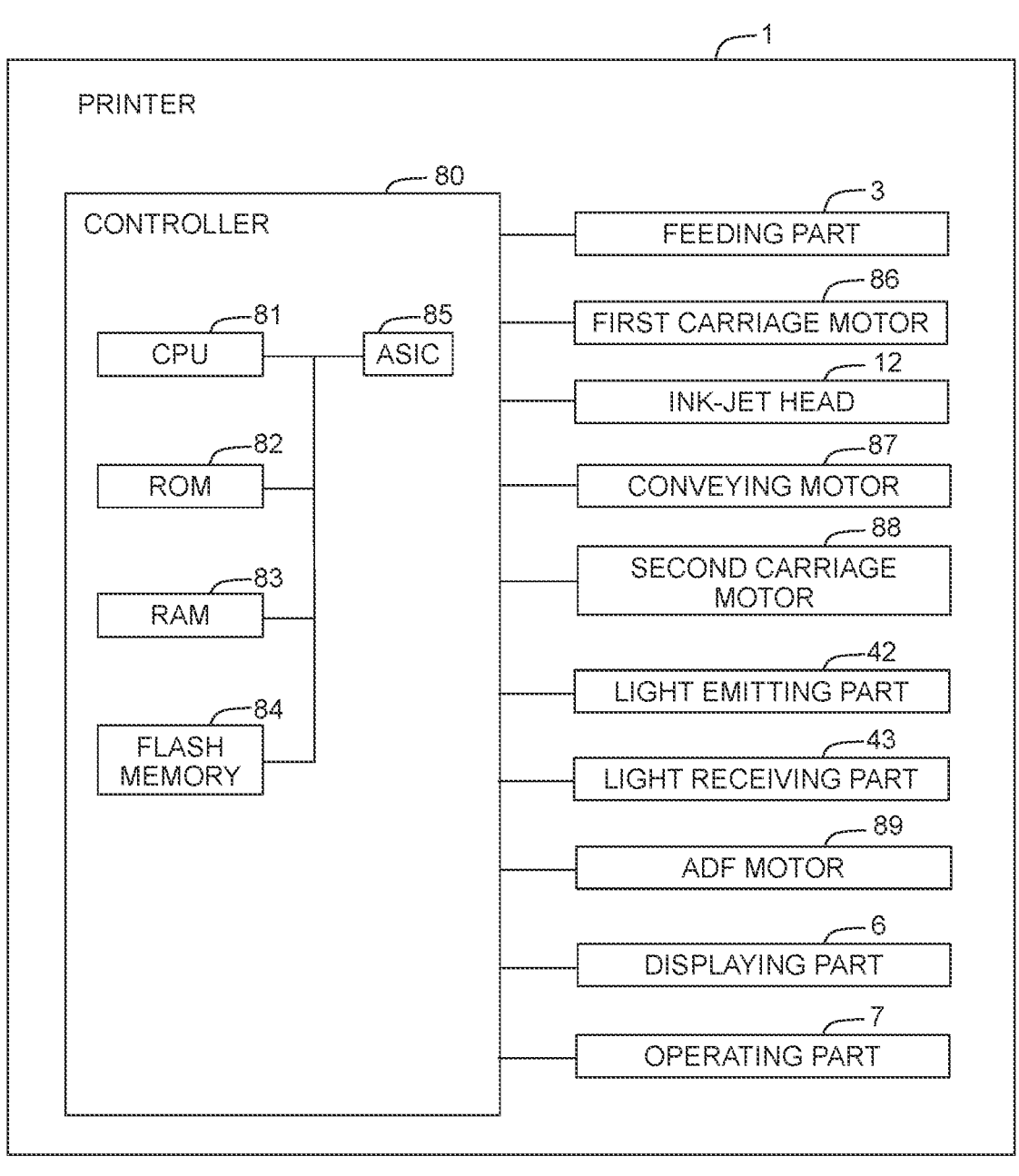
FIG. 6 is a block diagram depicting the electric configuration of the multifunction peripheral.

The second carriage 41 extends in the conveying direction over the entire length in the conveying direction of the placement stand 31. Further, the second carriage 41 is supported to be movable in the scanning direction by a non-illustrated guide rail. Furthermore, the second carriage 41 is connected to a second carriage motor 88 as depicted in FIG. 6, via a non-illustrated belt, etc. In a case that second carriage motor 88 is driven, the second carriage 41 moves in the scanning direction along the non-illustrated guide rail.

Figure 5B:
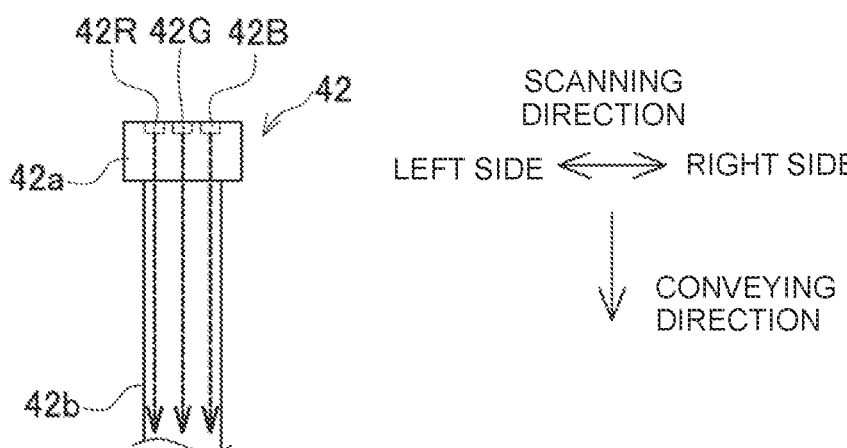
FIG. 5B is a view for explaining the configuration of a light emitting part of FIG. 5A.

The light emitting part 42 is arranged at an upper surface of the second carriage 41. As depicted in FIG. 5B, the light emitting part 42 has a light source unit 42a and a light guiding body 42b. The light source unit 42a has three light sources 42R, 42G and 42B. Each of the light sources 42R, 42G and 42B is, for example, an LED. The light source 42R emits a red light. The light source 42G emits a green light. The light source 42B emits a blue light. The light guiding body 42b extends in the conveying direction over the entire length in the conveying direction of the reading surface 31a. The light source unit 42a is connected to an end part on the upstream side in the conveying direction of the light guiding body 42b. The light guiding body 42b guides the red, green and blue lights emitted, respectively, from the light sources 42R, 42G and 42B, and emits the lights evenly or uniformly toward the reading surface 31a from parts, of the light guiding body 42b, which are positioned at respective positions in the conveying direction of the light guiding body 42b. With this, the light emitting part 42 emits the light of three colors which are the red, green and blue lights toward the reading surface 31a.

The plurality of light receiving parts 43 are arranged on the upper surface of the second carriage 41. The plurality of light receiving parts 43 are arranged to be adjacent side by side in the conveying direction over the entire length in the conveying direction of the reading surface 31a. The plurality of light receiving parts 43 receive the lights emitted from the light emitting parts 42 and reflected off a manuscript R1 placed on the placement surface 31a1 or off a manuscript R2 which passes (is passing) a location above the ADF reading surface 31a2. Further, each of the light receiving parts 43 individually detects a red component, a green component and a blue component of the received lights, and outputs a signal in accordance with the component of each of the colors.

The cover 34 is positioned at a location above the placement stand 31 and the frame part 32. The cover 34 is pivotally supported by a rocking shaft 1b. The rocking shaft 1b is provided on an end part on the upstream side in the conveying direction, in an upper end part of a casing 1a of the multifunction peripheral 1, and extends in the scanning direction. Further, the cover 34 is movable between a closed position at which the cover 34 covers the reading surface 31a as depicted in FIG. 4A and an open position at which the cover 34 exposes or release the reading surface 31a as depicted in FIG. 4B, by rocking with the rocking shaft 1b as the center of rocking motion.

The ADF 35 is provided on the cover 34. The ADF 35 is positioned above the ADF reading surface 31a2 in a state that the cover 34 is positioned at the closed position. The ADF 35 has a manuscript set part 51, a supplying roller 52, a guide route 53 and a discharging roller 54. Note that "ADF" is an abbreviation of "Auto Document Feeder".

The manuscript set part 51 is a part at which the manuscript R2 is set. It is possible to set, in the manuscript set part 51, one piece of the manuscript R2 or a plurality of pieces of the manuscript R2 which are overlapped in the up-down direction. The supplying roller 52 is positioned in the vicinity of a left end of the manuscript set part 51. The supplying roller 52 is connected to an ADF motor 89 as depicted in FIG. 6, via a non-illustrated gear, etc. In a case that the ADF motor 89 is driven, the supplying roller 52 is rotated, thereby conveying the manuscript R2 set in the manuscript set part 51 to the left side in the scanning direction. In a case that a plurality of pieces of the manuscript R2 overlapped in the up-down direction is set in the manuscript set part 51, one manuscript R2 which is located at the lowermost side among the plurality of manuscripts R2 is conveyed by the supplying roller 52.

The guide route 53 guides the manuscript R2 conveyed by the conveying roller 52. To provide more specified explanation, the guide route 53 is a route having an arc shape as seen from the conveying direction. The manuscript R2 which is (being) conveyed by the supplying roller 52 to the left side of the conveying direction is guided by the guide route 53 so that an orientation of the conveyance of the manuscript R2 is changed to be downward, and further afterward, the orientation of the conveyance of the manuscript R2 is changed to be rightward in the scanning direction. Further, the manuscript R2 fed from the guide route 53 is conveyed to the right side in the scanning direction, at a location immediately above the ADF reading surface 31a2.

The discharging roller 54 is connected to the ADF motor 89 as depicted in FIG. 6, via a non-illustrated gear, etc. In a case that the ADF motor 89 is driven, the discharging roller 54 is rotated, thereby conveying the manuscript R2 fed out from the guide route 53 to the right side in the scanning direction, and discharging the manuscript R2 to a discharging part 55 provided on the upper surface of the cover 34.

Further, a partition wall 36 which overlaps with the placement stand 31 in the up-down direction is arranged at a location below the reading unit 33. Namely, the reading unit 33 is arranged between the placement stand 31 and the partition wall 36 in the up-down direction. The partition wall 36 is configured to partition, in the multifunction peripheral 1, a space in which the reading unit 33 is arranged from a space in which the ink-jet head 12, etc., are arranged.

Further, in the present embodiment, as depicted in FIG. 5A, position displaying parts 37a and 37b are arranged on an upper surface 32a of the frame part 32, and position displaying parts 38a to 38e are arranged on an upper surface 36a of the partition wall 36. Here, since the placement stand 31 is transparent, the user is capable of visually recognizing the position displaying parts 38a to 38e which are arranged on the upper surface 36a of the partition wall 36 through the placement stand 31. Note that in the present embodiment, the upper surface 36a of the partition wall 36 corresponds to a "first surface" of the present disclosure.

The position displaying part 37a is provided so that, in a case that the user sets a paper sheet size of the recording paper sheet S on which an image is to be recorded, as will be described later on, the position displaying part 37a instructs a position in the scanning direction of the placement surface 31a1. The position displaying part 37b is provided so that, in a case that the user sets a resolution of an image to be recorded, as will be described later on, the position displaying part 37b instructs a position in the scanning direction of the placement surface 31a1.

The position displaying part 38a is provided so that, in a case that the user sets the paper sheet size to be a A4 size, as will be described later on, the position displaying part 38a instructs a position in the conveying direction of the placement surface 31a1. The position displaying part 38b is provided so that, in a case that the user sets the paper sheet size to be a A5 size, as will be described later on, the position displaying part 38b instructs a position in the conveying direction of the placement surface 31a1.

The position displaying part 38c is provided so that, in a case that the user sets the resolution of the image to be recorded to be 300 dpi, as will be described later on, the position displaying part 38c instructs a position in the conveying direction of the placement surface 31a1. The position displaying part 38d is provided so that, in a case that the user sets the resolution of the image to be recorded to be 200 dpi, as will be described later on, the position displaying part 38d instructs a position in the conveying direction of the placement surface 31a1. The position displaying part 38e is provided so that, in a case that the user sets the resolution of the image to be recorded to be 100 dpi, as will be described later on, the position displaying part 38e instructs a position in the conveying direction of the placement surface 31a1.

<Electric Configuration of the Printer>

Next, the electric configuration of the printer 1 will be described. As depicted in FIG. 6, the printer 1 includes a controller 80. The controller 80 is constructed of a CPU 81, a ROM 82, a RAM 83, a flash memory 84, an ASIC 85, etc. Note that the CPU is an abbreviation of a "Central Processing Unit", the ROM is an abbreviation of a "Read Only Memory", the RAM is an abbreviation of a "Random Access Memory" and the ASIC is an abbreviation of an "Application Specific Integrated Circuit".

The controller 80 controls the operation of each of the feeding part 3, the first carriage motor 86, the ink-jet head 12, the conveying motor 87, the second carriage motor 88, the light emitting part 42, the ADF motor 89, the displaying part 6, etc. Further, the controller 80 receives a signal from the operating part 7 and a signal from each of the light receiving parts 43.

Note that in the controller 80, only the CPU 81 may perform various kinds of processings or only the ASIC 85 may perform the various kinds of processings, or the CPU 81 and the ASIC 85 may perform the various kinds of processings in a cooperative manner. Alternatively, in the controller 80, one CPU 81 may singly perform a processing, or a plurality of pieces of the CPU 81 may perform the processing in a sharing manner. Still alternatively, in the controller 80, one ASIC 85 may singly perform a processing, or a plurality of pieces of the ASIC 85 may perform the processing in a sharing manner.

<Processing in a Case of Reading a Manuscript on the Placement Surface>

Next, an explanation will be given about a control performed by the controller 80 in a case that the manuscript R1 placed on the placement surface 31a1 is (to be) read. In the present embodiment, in a case that the controller 80 receives a first manuscript reading instruction of instructing to read the manuscript R1 placed on the placement surface 31a1, the controller 80 performs a processing along the flow chart of FIG. 7A. For example, in a case that the user performs, in the operating part 7, an operation of instructing to read the manuscript R1 placed on the placement surface 31a1 in a state that the user places the manuscript R1 on the placement surface 31a1 and positions the cover 34 at the closed position, the controller 80 receives the first manuscript reading instruction.

Figure 7A:
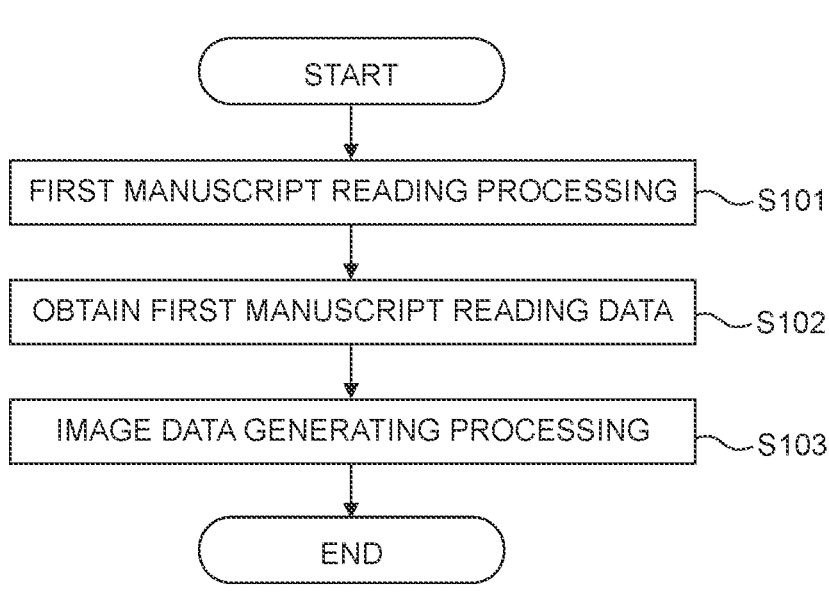
FIG. 7A is a flow chart indicating the flow of a processing in a case that a first manuscript reading instruction is received.

To provide an explanation regarding the flow chart of FIG. 7A, at first, the controller 80 executes a first manuscript reading processing (step S101). In the first manuscript reading processing, the controller 80 causes the light emitting part 42 to irradiate the placement surface 31a1 with the lights emitted from the light sources 42R, 42G and 42B, while controlling the second carriage motor 88 so as to cause the second carriage 41 to move in the scanning direction over an entire area of a range in which the placement surface 31a1 is positioned. With this, the controller 80 reads the manuscript R1 placed on the placement surface 31a1.

Next, the controller 80 obtains first manuscript reading data based on signals each of which is outputted from one of the light receiving parts 43 in a case that the first manuscript reading processing is performed (step S102). Next, the controller 80 generates image data of an image recorded on the manuscript R1, based on the first manuscript reading data (step S103). The image data generated in step S103 is, for example, stored in the flash memory 84. Further, in the multifunction peripheral 1, it is also possible to record an image corresponding to the image data in the recording unit 2, based on the image data generated in step S103.

<Processing in a Case of Reading a Manuscript Fed by the ADF>

Next, an explanation will be given about a control performed by the controller 80 in a case that the manuscript R2 is conveyed by the ADF 35 and is read by the reading unit 33. In the present embodiment, in a case that the controller 80 receives a second manuscript reading instruction of instructing to convey the manuscript R2 by the ADF 35 and to read the manuscript R2 by the reading unit 33, the controller 80 performs a processing along the flow chart of FIG. 7B. For example, in a case that the user performs, in the operating part 7, an operation of instructing to convey the manuscript R2 by the ADF 35 and to read the manuscript R2 by the reading unit 33 in a state that the user positions the cover 34 at the closed position and sets the manuscript R2 in the manuscript set part 51, the controller 80 receives the second manuscript reading instruction. Note that in the present embodiment, each of the above-described first manuscript reading instruction and the above-described second manuscript reading instruction corresponds to a "first instruction" of the resent disclosure.

Figure 7B:
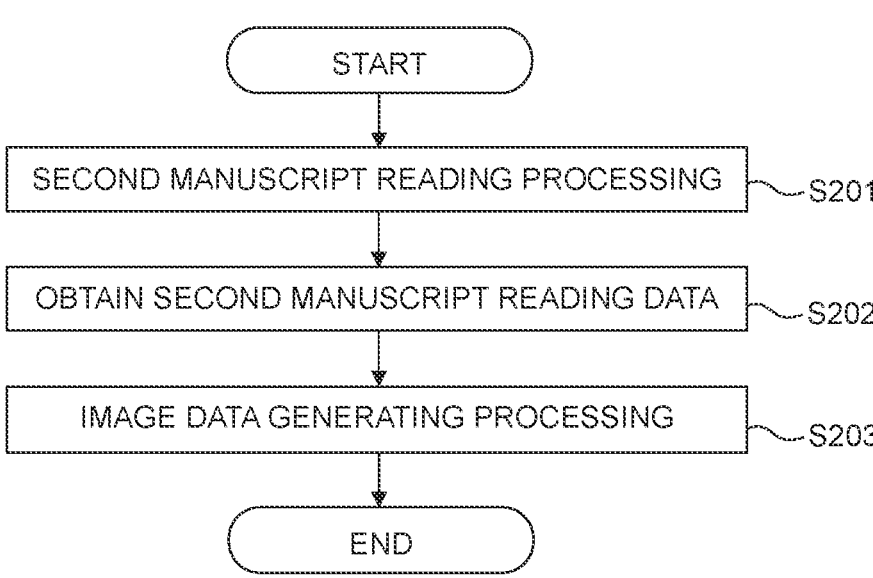
FIG. 7B is a flow chart indicating the flow of a processing in a case that a second manuscript reading instruction is received.

To provide an explanation regarding the flow chart of FIG. 7B, at first, the controller 80 executes a second manuscript reading processing (step S201). In the second manuscript reading processing, the controller 80 causes the light emitting part 42 to irradiate the placement surface 31a2 with the lights emitted from the light sources 42R, 42G and 42B, while the controller 80 controls the ADF motor 89 so as to cause the supplying roller 52 and the discharging roller 54 to convey the manuscript R2 toward the right side in the scanning direction at the location immediately above the ADF reading surface 31a2, in a state that the reading unit 33 is positioned at a standby position at which the reading unit 33 is overlapped, in the up-down direction, with the ADF reading surface 31a2 as indicated by broken lines in FIG. 5A. With this, the controller 80 reads the manuscript R2 which is (being) conveyed at the location immediately above the ADF reading surface 31a2. Note that in the present embodiment, the standby position is a position of the reading unit 33 in a case that the reading unit 33 is in a standby state. Further note that in the present embodiment, each of the above-described first manuscript reading operation and the above-described second manuscript reading operation corresponds to a "manuscript reading operation" of the resent disclosure.

Next, the controller 80 obtains second manuscript reading data based on signals each of which is outputted from one of the light receiving parts 43 in a case that the second manuscript reading processing is performed (step S202). Next, the controller 80 generates image data of an image recorded on the manuscript R2, based on the second manuscript reading data (step S203). The image data generated in step S203 is, for example, stored in the flash memory 84. Further, in the multifunction peripheral 1, it is also possible to record an image corresponding to the image data in the recording unit 2, based on the image data generated in step S203.

<Processing in a Case of Setting the Paper Sheet Size and the Resolution>

Next, an explanation will be given about the flow of a processing performed by the controller 80 in a case that setting of a paper sheet size and setting of a resolution of an image to be recorded are performed in the multifunction peripheral 1. In the multifunction peripheral 1, in a case that the controller 80 receives a setting instruction of instructing to perform the setting of the paper sheet size and the setting of the resolution of the image to be recorded, the controller 80 performs a processing along a flow chart of FIG. 8. For example, in a case that the user performs, in the operating part 7, an operation of instructing to perform the above-described setting in a state that the user positions the cover 34 at the closed position, the controller 80 receives the setting instruction. Note that in the present embodiment, the setting instruction corresponds to a "second instruction" of the present disclosure.

Figure 8:
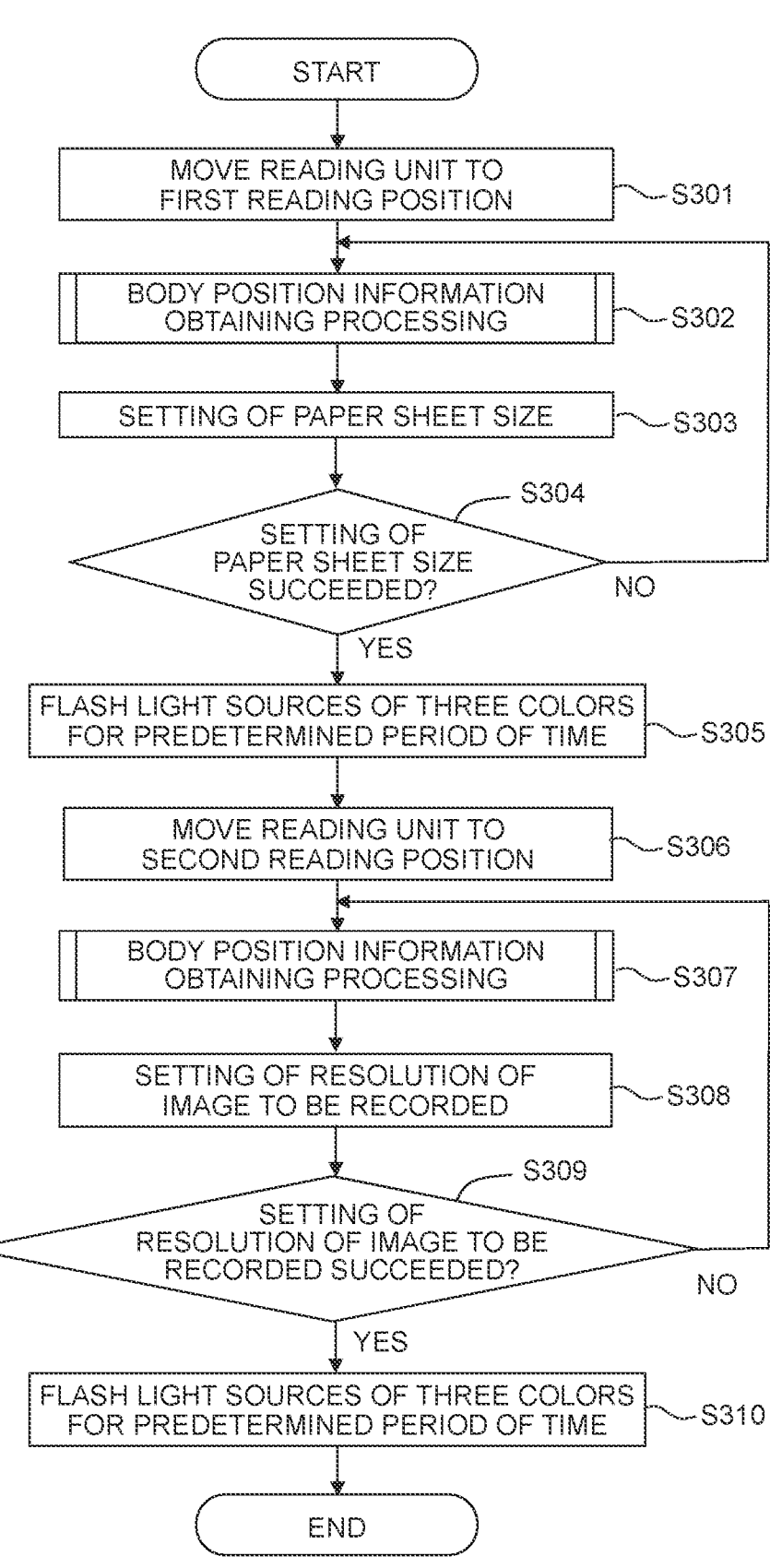
FIG. 8 is a flow chart indicating the flow of a processing in a case that a setting instruction is received.

To provide an explanation regarding the flow chart of FIG. 8, at first, the controller 80 drives the second carriage motor 88 so as to cause the second carriage 41 to move in the scanning direction, thereby causing the reading unit 33 to move to a first reading position (step S301). The first reading position is a position in the scanning direction, of the reading unit 33, which is indicated by a solid line in FIG. 5A, namely, a position in the scanning direction of the reading unit 33 in a case that the light guiding member 42b and the plurality of light receiving parts 43 of the light emitting part 42 overlap, in the up-down direction, with a position in the scanning direction of the placement surface 31a1 indicated by the position displaying part 37a. By the processing of step S301, the reading unit 33 is moved from the standby position indicated by the broken lines in FIG. 5A to the first reading position indicated by the solid lines in FIG. 5A.

Next, the controller 80 executes a body position information obtaining processing (step S302). In the body position information obtaining processing, the controller 80 performs a processing along a flow chart of FIG. 9. To provide an explanation regarding the flow chart of FIG. 9, at first, the controller 80 executes a body reading processing (step S401). In the body reading processing, the controller 80 causes the reading unit 33 to perform a body reading operation. In the body reading operation, the controller 80 controls the light emitting part 42 so as to irradiate the placement surface 31a1 with the lights emitted, respectively, from the light sources 42R, 42G and 42B, thereby reading a position of a finger F, of the user, which is positioned on the placement surface 31a1. In this situation, the controller 80 performs lighting (turning on) of the light sources 42R, 42G and 42B, namely, continuously performs the irradiation of the placement surface 31a1 with the lights emitted from the light emitting part 42, thereby performing the body reading operation. Note that the body reading operation performed by the body reading processing of step S401 in the body position information obtaining processing of step S302 corresponds to a "first body reading operation" of the present disclosure.

Next, the controller 80 obtains body reading data based on a signal which is outputted from each of plurality of light receiving parts 43 in a case that the body reading operation is performed (step S402). Next, the controller 80 determines, based on the body reading data, as to whether or not there is present a light receiving part 43 which outputs a signal indicating color components of the light within a predetermined range (step S403). Here, in a state that the finger F of the user is not positioned on the placement surface 31a1 immediately after the light has been emitted from the light emitting part 42 in step S401, the color components of the lights indicated by the values of the signals outputted from all of the light receiving parts 43 are outside the predetermined range. Afterwards, in a case that the finger F of the user is placed at any part, in the placement surface 31a1, of an area of which position in the scanning direction is indicated by the position displaying part 37a, as depicted in FIG. 5A, color components of a light indicated by a value of a signal outputted from a light receiving part 43 which corresponds to the position of the finger F of the user falls within the predetermined range. Namely, the predetermined range is a range in accordance with the color of the finger F of the user. For example, in a case that the color components are indicated, regarding three color components of red, green and blue, by values of 256 steps in a range of 0 to 255 of which color component is higher as the value thereof is greater, the predetermined range is a range wherein the value of the red component is not less than 218 (=238−20), the value of the green component is 214±20 and value of the blue component is 183±20. Alternatively, in a case that the color components are indicated, regarding the three color components of red, green and blue, by a ratio in a range of 1% to 100% of which color component is higher as the ratio thereof is greater, the predetermined range is a range wherein the ratio of the red component is not less than 89% (=99−10%), the ratio of the green component is 86±10% and the ratio of blue component is 74±10%. Note that in the present embodiment, the finger F of the user corresponds to a "part of the body".

In a case that there is not present any light receiving part 43 which outputs a signal indicating the color components of the light within the predetermined range (step S403: NO), the controller 80 returns the processing to step S401. In a case that a state that there is not present any light receiving part 43 which outputs the signal indicating the color components of the light within the predetermined range is continued for a previously set period of time since the body position information obtaining processing has been started, the controller 80 may cause the displaying part 6 to perform displaying an indication of an error and then may end the processing. In a case that there is present a light receiving part 43 which outputs the signal indicating the color components of the light within the predetermined range (step S403: YES), the controller 80 obtains position information of the finger F of the user, based on the position in the conveying direction of the light receiving part 43 which outputs the signal indicating the color components of the light within the predetermined range (step S404), and the controller 80 returns to the flow chart of FIG. 8.

Subsequently, the controller 80 sets the paper sheet size based on the position information of the finger F of the user obtained in step S404 (step S303). Specifically, in a case that the position of the finger F of the user indicated by the position information obtained in step S404 of the body position information obtaining processing of step S302 is a position indicated by the position displaying part 38a, the controller 80 sets the paper sheet size to be the A4 size. Alternatively, in a case that the position of the finger F of the user indicated by the position information obtained in step S404 of the body position information obtaining processing of step S302 is a position indicated by the position displaying part 38b, the controller 80 sets the paper sheet size to be the A5 size. Note, however, that in a case that the position of the finger F of the user indicated by the position information obtained in step S404 of the body position information obtaining processing of step S302 is a position indicated by neither the position displaying part 38a nor the position displaying part 38b, the setting of the paper sheet size fails.

In a case that the setting of the paper sheet size fails in step S303 (S304: NO), the controller 80 returns the processing to step S302. In a case that the setting of the paper sheet size fails continuously by a previously set number of times, the controller 80 may cause the displaying part 6 to perform displaying of indication of an error and then the controller 80 may end the processing. In a case that the setting of the paper sheet size succeeds in step S303 (S304: YES), the controller 80 controls the light emitting part 42 so as to cause the light sources 42R, 42G and 42B to flash (be turned on and off) for a predetermined period of time (step S305). Namely, the controller 80 causes the light emitting part 42 to perform the emission of the lights in an aspect different from that in the body reading operation.

Next, the controller 80 drives the second carriage motor 88 so as to move the reading unit 33 to a second reading position (step S306). The second reading position is a position in the scanning direction, of the reading unit 33, which is indicated by dash-dot lines in FIG. 5A, namely, a position in the scanning direction of the reading unit 33 in a case that the light guiding member 42b and the plurality of light receiving parts 43 of the light emitting part 42 overlap, in the up-down direction, with a position in the scanning direction, of the placement surface 31a1, indicated by the position displaying part 37b. By the processing of step S306, the reading unit 33 is moved from the first reading position indicated by the solid lines in FIG. 5A to the second reading position indicated by the dash-dot lines in FIG. 5A. Further, in the present embodiment, after the processing of step S305, the processing of the step S306 is executed without any operation by the user, and the reading unit 33 is moved to the second reading position.

Next, the controller 80 executes a body position information obtaining processing (step S307). In the body position information obtaining processing of step S307, the controller 80 performs the processing along the flow chart of FIG. 9, in a similar manner to that in the body position information obtaining processing of step S302. Note that a body reading operation performed by the body reading processing of step S401 in the body position information obtaining processing in step S307 corresponds to a "second body reading processing" of the present disclosure.

Subsequent to the body position information obtaining processing of step S307, the controller 80 performs setting of a resolution of the image to be recorded, based on the position information of the finger F of the user obtained in step S404 of the body position information obtaining processing of step S307 (step S308). Specifically, in a case that the position of the finger F of the user indicated by the position information obtained in step S404 of the body position information obtaining processing of step S307 is a position indicated by the position displaying part 38c, the controller 80 sets the resolution of the image to be recorded to be 300 dpi. On the other hand, in a case that the position of the finger F of the user indicated by the position information obtained in step S404 of the body position information obtaining processing of step S307 is a position indicated by the position displaying part 38d, the controller 80 sets the resolution of the image to be recorded to be 200 dpi. On the other hand, in a case that the position of the finger F of the user indicated by the position information obtained in step S404 of the body position information obtaining processing of step S307 is a position indicated by the position displaying part 38e, the controller 80 sets the resolution of the image to be recorded to be 100 dpi. Note that in a case that the position of the finger F of the user indicated by the position information obtained in step S404 of the body position information obtaining processing of step S307 is a position indicated by none of the position displaying parts 38c to 38e, the setting of the resolution of the image to be recorded fails.

In a case that the setting of the resolution of the image to be recorded fails in step S308 (S309: NO), the controller 80 returns the processing to step S307. In a case that the setting of the resolution of the image to be recorded fails continuously by a previously set number of times, the controller 80 may cause the displaying part 6 to perform displaying of an indication of an error and then the controller 80 may end the processing. In a case that the setting of the resolution of the image to be recorded succeeds in step S308 (S309: YES), the controller 80 controls the light emitting part 42 so as to cause the light sources 42R, 42G and 42B to flash (be turned on and off) for a predetermined period of time (step S310), and then ends the processing.

Note that in the present embodiment, the setting of the paper sheet size and the setting of the resolution of the image to be recorded correspond to a "setting" of the present disclosure.

Further, in the present disclosure, in a relationship between the position in the conveying direction indicated by the position displaying part 38*a* and the position in the conveying direction indicated by the position displaying part 38*b*, the position in the conveying direction indicated by the position displaying part 38*a* corresponds to a "first position" of the present disclosure, and the position in the conveying direction indicated by the position displaying part 38*b* corresponds to a "second position" of the present disclosure. In this situation, "setting the paper sheet size to be the A4 size" corresponds to "make the setting to be a first setting" of the present disclosure, and "setting the paper sheet size to be the A5" size corresponds to "make the setting to be a second setting" of the present disclosure.

Furthermore, in the present disclosure, in a relationship between a position in the conveying direction indicated by one of any two of the position displaying parts 38*c* to 38*e* and a position in the conveying direction indicated by the other of the any two of the position displaying parts 38*c* to 38*e*, the position in the conveying direction indicated by the one of the any two of the position displaying parts 38*c* to 38*e* corresponds to the "first position" of the present disclosure, and the position in the conveying direction indicated by the other of the any two of the position displaying parts 38*c* to 38*e* corresponds to the "second position" of the present disclosure. In this situation, "setting the resolution of the image to be recorded to the resolution corresponding to the one of the any two of the position displaying parts 38*c* to 38*e*" corresponds to "make the setting to be the first setting" of the present disclosure, and "setting the resolution of the image to be recorded to the resolution corresponding to the other of the any two of the position displaying parts 38*c* to 38*e*" corresponds to "make the setting to be the second setting" of the present disclosure.

Moreover, in the present disclosure, in a relationship between the positions in the conveying direction indicated, respectively, by the position displaying part 37*a* and the position displaying parts 38*a* and 38*b* and the positions in the conveying direction indicated, respectively, by the position displaying part 37*b* and the position displaying parts 38*c* to 38*e*, the positions in the conveying direction indicated, respectively, by the position displaying part 37*a* and the position displaying parts 38*a* and 38*b* correspond to a "third position" of the present disclosure, and the positions in the conveying direction indicated, respectively, by the position displaying part 37*b* and the position displaying parts 38*c* to 38*e* correspond to a "fourth position" of the present disclosure. In this situation, "setting the paper sheet size to be the A4 size or the A5 size" corresponds to "make the setting to be a third setting" of the present disclosure, and "setting the resolution of the image to be recorded to be any one of 300 dpi, 200 dpi and 100 dpi" corresponds to "make the setting to be a fourth setting" of the present disclosure.
<Effects>

In the present embodiment, it is possible to perform the setting of the paper sheet size and the setting of the resolution of the image to be recorded, each of which are the setting regarding the recording in the recording unit 2, by a simple operation of reading, by the reading unit 33, the finger F of the user which is placed at the position, on the placement surface 31*a*1, corresponding to the setting desired by the user, in the state that the cover 34 is positioned at the open position.

Further, in this situation, it is possible to make the setting of the multifunction peripheral 1 to be the first setting by a simple operation of reading, by the reading unit 33, the finger F of the user placed at the first position. Furthermore, it is possible to make the setting of the multifunction peripheral 1 to be the second setting by a simple operation of reading, by the reading unit 33, the finger F of the user placed at the second position.

Furthermore, in this situation, it is possible to make the setting of the multifunction peripheral 1 to be the third setting by a simple operation of reading, by the reading unit 33, the finger F of the user placed at the third position. Moreover, it is possible to make the setting of the multifunction peripheral 1 to be the fourth setting by a simple operation of reading, by the reading unit 33, the finger F of the user placed at the fourth position.

Further, in the present embodiment, in response to the receipt of the first manuscript reading instruction, it is possible to cause the reading unit 33 to read the manuscript R1 placed on the placement surface 31*a*1 to thereby generate the image data of the image recorded on the manuscript R1. Furthermore, in response to the receipt of the second manuscript reading instruction, it is possible to cause the reading unit 33 to read the manuscript R2 which is (being) conveyed at the location immediately above the ADF reading surface 31*a*2 to thereby generate the image data of the image recorded on the manuscript R2. On the other hand, in response to the receipt of the setting instruction, it is possible to cause the reading unit 33 to read the finger F of the user which is placed on the placement surface 31*a*1 to thereby perform the setting of the paper sheet size and the setting of the resolution of the image to be recorded.

Moreover, in the present embodiment, after the setting of the paper sheet size is completed, the reading unit 33 is moved from the first reading position to the second reading position without any operation of the user. With this, after the setting of the paper sheet size is completed, it is possible to shorten a time required for performing the setting the paper sheet size and the setting of the resolution of the image to be recorded, as compared with a case wherein, after the completion of the setting of the paper sheet size, the reading unit 33 is moved from the first reading position to the second reading position after a predetermined operation for instructing the movement of the reading unit has been performed by the user.

Further, in the present embodiment, in a case that the setting of the paper sheet size has succeeded, and in a case that the setting of the resolution of the image to be recorded has succeeded, the light sources 42R, 42G and 42B are caused to flash (turned on and off) for the predetermined period of time. With this, it is possible to cause the user to recognize that the setting of the paper sheet size has succeeded and that the setting of the resolution of the image to be recorded has succeeded.

Furthermore, in the present embodiment, in the case that the user places the finger F thereof on the placement surface 31*a*1 in accordance with the setting desired by the user, it is possible to cause the user to recognize as to at which position the finger F of the user is to be placed, based on the displaying of each of the position displaying parts 37*a*, 37*b* and 38*a* to 38*e*.

Moreover, in the present embodiment, the position displaying parts 38*a* to 38*e* are arranged on the upper surface 36*a* of the partition wall 36 which is visually recognizable from thereabove through the transparent placement stand 31. With this, it is possible to cause the user to recognize as to at which position the finger F of the user is to be placed, based on the position indicated by each of the position displaying parts 38*a* to 38*e*, as described above. Further, by arranging the position displaying parts 38*a* to 38*e* on the upper surface of the partition wall 36, it is possible to avoid such a situation that the position displaying parts 38*a* to 38*e* might cause any hindrance in the case of causing the reading unit 33 to read the manuscript R1 on the placement surface 31a1 or the finger F of the user on the placement surface 31a1.

Further, in the present embodiment, the position displaying parts 37a and 37b are arranged on the upper surface 32a of the frame part 32 which surround the reading surface 31a (placement surface 31a1). With this, it is possible to cause the user to recognize as to at which position the finger F of the user is to be placed, based on the positions indicated, respectively, by the position displaying parts 37a and 37b, as described above. Further, by arranging the position displaying parts 37a and 37b on the upper surface 32a of the frame part 32, it is possible to avoid such a situation that the position displaying parts 37a and 37b might cause any hindrance in the case of causing the reading unit 33 to read the manuscript R1 on the placement surface 31a1 or the finger F of the user on the placement surface 31a1.

Furthermore, in the present embodiment, the light emitting part 42 emits the lights of the three colors, and each of the light receiving parts 43 outputs the signal in accordance with the color components of the lights of the three colors received thereby. Thus, in the present embodiment, it is possible to obtain the position information of the finger F of the user in the placement surface 31a1, based on the position in the conveying direction of a light receiving part 43 which outputs a signal indicating the color components the lights of the three colors within a predetermined range. Further, based on the position information, it is possible to perform the setting of the paper sheet size and the setting of the resolution of the image to be recorded.

<Modifications>

In the foregoing, the embodiment of the present disclosure has been explained. The present disclosure, however, is not limited to or restricted by the above-described embodiment; a various kinds of change can be made to the present disclosure within the range described in the claims.

In the above-described embodiment, the controller 80 causes the light emitting part 42 to irradiate the placement surface 31a1 with the lights of the three colors emitted, respectively, from the light sources 42R, 42G and 42B, and the controller 80 obtains the position information of the finger F of the user based on the position in the conveying direction of a light receiving part 43 which outputs the signal indicating the color components the lights of the three colors within the predetermined range. The present disclosure, however, is not limited to or restricted by this. For example, the kind of the color of the light emitted by the light emitting part 42 may be two kinds or not less than four kinds.

Figure 9:
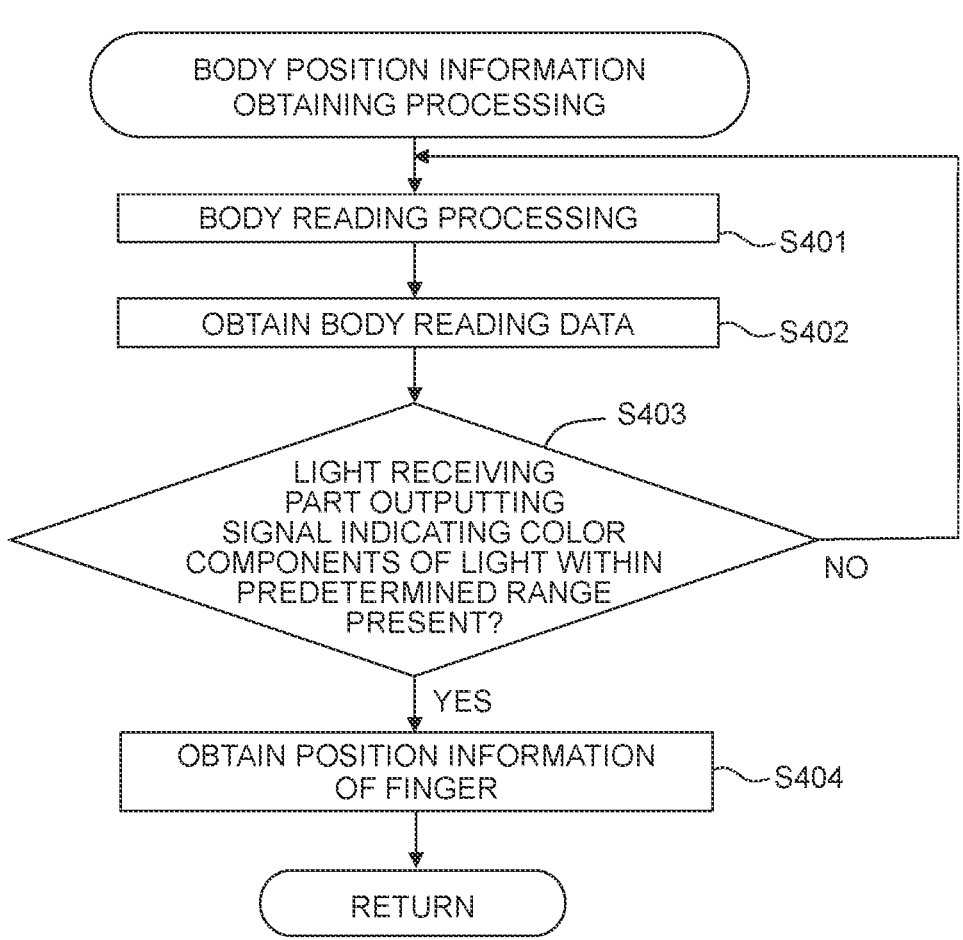
FIG. 9 is a flow chart indicating the flow of a body position information obtaining processing of FIG. 8.

Further, the present disclosure is not limited also to (the processing of) obtaining the position information of the finger F of the user based on the position in the conveying direction of a light receiving part 43 which outputs the signal indicating the color components the lights of the three colors within the predetermined range. In a first modification, each of the light receiving parts 43 outputs a signal of which value corresponds to a brightness of the lights received thereby. Further, in the first modification, in the body position information obtaining processing, the controller 80 performs a processing along a flow chart of FIG. 10A. In the flow chart of FIG. 10A, the processing of step S403 in the flow chart of FIG. 9 is replaced with a processing of step S501.

In step S501, the controller 80 determines, based on the body reading data, as to whether or not there is present a light receiving part 43 which outputs the signal indicating the brightness of the lights of the three colors within a predetermined range. Here, in a state immediately after the lights are emitted, respectively, from the light sources 42R, 42G and 42B in step S401, the brightness of the lights indicated by the values of the signals outputted from all of the light receiving parts 43 are outside the predetermined range. Afterwards, in a case that the finger F of the user is placed at any part, on the placement surface 31a1, of an area of which position in the scanning direction is indicated by the position displaying part 37a or 37b, as depicted in FIG. 5A, the brightness of the lights indicated by a value of a signal outputted from a light receiving part 43 corresponding to the position at which the finger F of the user is placed falls within the predetermined range. For example, in a case that the brightness is indicated by a gray scale of 256 steps, the predetermined range is, for example, a range of 150 to 200.

In a case that there is not present any light receiving part 43 which outputs the signal indicating the brightness of the lights within the predetermined range (step S501: NO), the controller 80 returns the processing to step S401. In a case that there is present a light receiving part 43 which outputs the signal indicating the brightness of the lights within the predetermined range (step S501: YES), the controller 80 obtains the position information of the finger F of the user, based on the position in the conveying direction of the light receiving part 43 which outputs the signal indicating the brightness of the lights within the predetermined range (step S404), and the controller 80 returns to the flow chart of FIG. 8.

In the first modification, each of the light receiving parts 43 outputs the signal in accordance with the brightness of the lights received thereby. Accordingly, in the first modification, it is possible to obtain the position information of the finger F of the user in the placement surface 31a1, based on the position in the conveying direction of a light receiving part 43 which outputs the signal indicating the brightness of the lights within the predetermined range. Further, based on the position information, it is possible to perform the setting of the paper sheet size and the setting of the resolution of the image to be recorded.

Note that the first modification is not limited to emitting the lights of the plurality of colors from the light emitting part 42. It is allowable to emit only a light of one kind of color from the light emitting part 42.

In a second modification, each of the light receiving parts 43 outputs a signal of which value corresponds to a characteristic of lights received thereby. The signal of which value corresponds to the characteristic of the lights received by each of the light receiving parts 43 is, for example, a signal in accordance with the brightness of the lights received, similarly to the first modification. Further, in the second modification, in the body position information obtaining processing, the controller 80 performs a processing along a flow chart of FIG. 10B. In the flow chart of FIG. 10B, the processing of step S403 in the flow chart of FIG. 9 is replaced with a processing of step S502.

In step S502, the controller 80 determines as to whether or not there is present a light receiving part 43 in which a value of the signal outputted therefrom is changed by not less than a predetermined amount, based on the body reading data. Here, in a case that the finger F of the user is placed at any part, on the placement surface 31a1, of an area of which position in the scanning direction is indicated by the position displaying part 37a or 37b, a value of a signal outputted from a light receiving part 43 which corresponds to the position at which the finger F of the user is placed is changed greatly from a value before the finger F is placed in this area to a value after the finger F of the user is placed in this area. On the other hand, a value of a signal outputted from another light receiving part 43 which corresponds to a position different from the position at which the finger F of the user is placed is hardly changed in this area.

In a case that there is not present any light receiving part 43 in which the value of the signal outputted therefrom has changed by not less than the predetermined amount (step S502: NO), the controller 80 returns the processing to step S401. In a case that there is present a light receiving part 43 in which the value of the signal outputted therefrom has changed by not less than the predetermined amount (step S502: YES), the controller 80 obtains position information of the finger F of the user, based on the position in the conveying direction of the light receiving part 43 in which the value of the signal outputted therefrom has changed by not less than the predetermined amount (step S404), and the controller 80 returns to the flow chart of FIG. 8.

In the second modification, the controller 80 is capable of obtaining the position information of the finger F of the user in the placement surface 31a1, based on the position in the conveying direction of the light receiving part 43 in which the value of the signal outputted therefrom has changed by not less than the predetermined amount. Further, based on the position information, it is possible to perform the setting of the paper sheet size and the setting of the resolution of the image to be recorded.

In a third modification, each of the light receiving parts 43 outputs a signal of which value corresponds to a characteristic of lights received thereby. The signal of which value corresponds to the characteristic of the lights received by each of the light receiving parts 43 is, for example, a signal in accordance with the brightness of the lights received thereby, similarly to the first modification. Further, in the third modification, in the body position information obtaining processing, the controller 80 performs a processing along a flow chart of FIG. 10C. In the flow chart of FIG. 10C, the processing of step S403 in the flow chart of FIG. 9 is replaced with a processing of step S503 and the processing of step S404 in the flow chart of FIG. 9 is replaced with a processing of step S504.

In step S503, the controller 80 determines as to whether or not there are present adjacent light receiving parts 43 which are adjacent to each other in the conveying direction and in which a difference between the values of the signals, each outputted from one of the adjacent light receiving parts 43, is not less than a predetermined amount. Here, in a case that the finger F of the user is placed at any part, on the placement surface 31a1, of an area of which position in the scanning direction is indicated by the position displaying part 37a or 37b, the difference between the signals each of which is outputted from one of the adjacent light receiving parts 43 becomes to be not less than the predetermined amount at a position of an edge of the finger F of the user in this area.

In a case that there are not present any adjacent light receiving parts 43 which are adjacent to each other in the conveying direction and in which the difference between the values of the signals, each outputted from one of the adjacent light receiving parts 43, is not less than the predetermined amount (step S503: NO), the controller 80 returns the processing to step S401. In a case that there are present adjacent light receiving parts 43 which are adjacent to each other in the conveying direction and in which the difference between the values of the signals, each outputted from one of the adjacent light receiving parts 43, is not less than the predetermined amount (step S503: YES), the controller 80 obtains the position information of the position of the edge of the finger F of the user, based on the positions in the conveying direction of the adjacent light receiving parts 43

(step S504), and the controller 80 returns to the flow chart of FIG. 8. Further, in the third modification, the controller 80 sets the paper sheet size in step S303, based on the position of the edge of the finger F of the user indicated by the position information obtained in step S504. Furthermore, in the third modification, the controller 80 sets the resolution of the image to be recorded in step S308, based on the position of the edge of the finger F of the user indicated by the position information obtained in step S504.

Here, in the case that the finger F of the user is placed on the reading surface 31a, another finger of the user, the palm of the user, etc., is/are placed at a position which is located above the placement surface 31a1 and separated from the reading surface 31a, in some cases. In such a situation, the value of the signal outputted from a light receiving part 43 or light receiving parts 43 which correspond(s) to the position(s) of the another finger of the user, the palm of the user, etc., is/are changed. In this case, however, since the another finger of the user, the palm of the user, etc., is/are separated from the placement surface 31a1, a difference between the values of the signals outputted from adjacent light receiving parts 43 which are adjacent at the position(s) of the another finger of the user, the palm of the user, etc., is smaller than the difference between the values of the signals outputted from adjacent light receiving parts 43 which are adjacent at the position of the edge of the finger F of the user, and becomes to be less than the predetermined amount.

In view of the above situation, in the third modification, the controller 80 performs the setting of the paper sheet size and the setting of the resolution of the image to be recorded, based on the position of the edge of the finger F of the user. To provide a more detailed explanation, in the third modification, the controller 80 determines as to whether or not there is present an edge at which the difference between the values is remarkable. In a case that the finger F of the user is caused to make contact with the placement surface 31a1, a light reflected off the finger F of the user reflects off the light receiving part 43 to a greater extent, and the boundary between the finger F of the user and the surrounding of the finger F of the user becomes to be clear or distinct. On the other hand, a part, on the placement surface 31a1, with which the finger F of the user does not make contact, receives a great amount of the light reflected off by an object, etc., which is different from the finger F of the user, to a great extent, and thus the boundary between this part and the surrounding of the part becomes to be blurred and thus does not become to be distinct. In the third modification, the controller 80 determines as to whether or not the finger F of the user is placed, depending on as to whether or not the edge, which is an image of which boundary is distinct, has been detected. Accordingly, such a situation that the position of the another finger of the user, the palm of the user, etc., which is/are not brought into contact with the placement surface 31a1 by the user is/are erroneously determined as the position of the finger F of the user is less likely to occur. Therefore, in the case of obtaining the position information of the position of the edge of the finger F of the user is obtained as in the third modification, it is possible to determine the position of the finger F of the user more accurately.

Further, in the above-described embodiment, although the light sources 42R, 42G and 42B are caused to flash (turned on and off) for the predetermined period of time in the case that the setting has succeeded, the present disclosure is not limited to this. For example, in the case that the setting has succeeded, it is also allowable to cause only one light source or two light sources among the light sources 42R, 42G and 42B to flash for the predetermined period of time. Alternatively, in the case that the setting has succeeded, it is also allowable to cause not less than two light sources among the light sources 42R, 42G and 42B to flash one by one, in order and in periodical manner.

In a fourth modification, in a case that the controller 80 receives the setting instruction, the controller 80 performs a processing along a flow chart of FIG. 11A. In the flow chart of FIG. 11A, the processing of step S305 and the processing of step S310 in the flow chart of FIG. 8 are replaced, respectively, with a processing of step S601 and a processing of step S602. In each of the processing of step S601 and the processing of step S602, the controller 80 causes the light sources 42R, 42G and 42B to turned off. Namely, the controller 80 stops the emission of the lights from the light emitting part 42.

In the fourth modification, in a case that the setting of the paper sheet size has succeeded and in a case that the setting of the resolution of the image to be recorded has succeeded, the lights are not emitted from the light emitting part 42. With this, it is possible to cause the user to recognize that the setting of the paper sheet size has succeeded and that the setting of the resolution of the image to be recorded has succeeded.

In a fifth modification, in a case that the controller 80 receives the setting instruction, the controller 80 performs a processing along a flow chart of FIG. 11B. In the flow chart of FIG. 11B, the processing of step S305 and the processing of step S310 in the flow chart of FIG. 8 are replaced, respectively, with a processing of step S603 and a processing of step S604. In each of the processing of step S603 and the processing of step S604, the controller 80 controls the second carriage motor 88 so as to move the second carriage 41, thereby moving the reading unit 33 minutely in the scanning direction. In this situation, it is allowable that the controller 80 causes the reading unit 33 to move minutely only to the right side of the scanning direction, or to move minutely only to the left side of the scanning direction, or to move minutely and reciprocally to the right side and left side of the scanning direction.

In the fifth modification, in a case that the setting of the paper sheet size has succeeded and in a case that the setting of the resolution of the image to be recorded has succeeded, the reading unit 33 is caused to move minutely. With this, it is possible to cause the user to recognize that the setting of the paper sheet size has succeeded and that the setting of the resolution of the image to be recorded has succeeded.

Further, in the fifth modification, although the reading unit 33 is caused to move minutely in the scanning direction in the case that the setting of the paper sheet size has succeeded and in the case that the setting of the resolution of the image to be recorded has succeeded, the present disclosure is not limited to this. It is allowable to cause the reading unit 33 to move greatly, to some extent, in the scanning direction in the case that the setting of the paper sheet size has succeeded and in the case that the setting of the resolution of the image to be recorded has succeeded. Alternatively, it is also allowable to configure the reading unit 33 to be movable in a direction different from the scanning direction, such as, for example, the conveying direction, the up-down direction, etc., and to cause the reading unit 33 to move in the direction different from the scanning direction in the case that the setting of the paper sheet size has succeeded and in the case that the setting of the resolution of the image to be recorded has succeeded.

Alternatively, in the case that the setting of the paper sheet size has succeeded and in the case that the setting of the resolution of the image to be recorded has succeeded, it is also allowable to perform another operation, different from those as explained in the above-described embodiment and in the fourth and fifth modifications, to thereby cause the user to recognize that the setting of the paper sheet size has succeeded and that the setting of the resolution of the image to be recorded has succeeded.

Further, in the above-described embodiment and in the fourth and fifth modifications, in the case that the setting of the paper sheet size has succeeded and in the case that the setting of the resolution of the image to be recorded has succeeded, any operation for causing the user to recognize the success of the setting(s) is performed. It is also allowable, however, that in a case that the setting of the paper sheet size has failed and in a case that the setting of the resolution of the image to be recorded has failed, an operation for causing the user to recognize the failure of the setting(s) is performed.

Furthermore, both in the case that the setting of the paper sheet size has succeeded and the case that the setting of the paper sheet size has failed, and both in in the case that the setting of the resolution of the image to be recorded has succeeded and the case that the setting of the resolution of the image to be recorded has failed, it is allowable that an operation for causing the user to recognize both of the success and the failure of the settings is performed.

For example, in a sixth modification, in a case that the controller 80 receives the setting instruction, the controller 80 performs a processing along a flow chart of FIG. 12. In the flow chart of FIG. 12, the processing of step S305 and the processing of step S310 in the flow chart of FIG. 8 are replaced, respectively, with a processing of step S701 and a processing of step S702 and a processing to be performed in a case that the setting is determined to be failed in step S304 and a processing to be performed in a case that the setting is determined to be failed in step S309 are made to be different.

In the processing of each of step S701 and step S702, the controller 80 causes the light source 42G of the green light to be turned on for a predetermined period of time, without causing each of the light source 42R of the red light and the light source 42B of the blue light to be turned on. Namely, in the processing of each of step S701 and step S702, the controller 80 causes the light emitting part 42 to perform the emission of the green light, without causing the light emitting part 42 to perform the emissions of the red light and the blue light. Further, in the sixth modification, in the case that the controller 80 determines that the setting of the paper sheet size has failed in step S304 (step S304: NO), the controller 80 causes the light source 42R of the red light to be turned on for a predetermined period of time, without causing each of the light source 42G of the green light and the light source 42B of the blue light to be turned on (step S703), and the controller 80 returns the processing to step S302. Furthermore, in the sixth modification, in the case that the controller 80 determines that the setting of the resolution of the image to be recorded has failed in step S309 (step S309: NO), the controller 80 causes the light source 42R of the red light to be turned on for a predetermined period of time, without causing each of the light source 42G of the green light and the light source 42B of the blue light to be turned on (step S704), and the controller 80 returns the processing to step S307. Namely, in the sixth modification, the controller 80 causes, in each of steps S703 and S704, the light emitting part 42 to perform the emission of the red light, without causing the light emitting part 42 to perform the emissions of the green light and the blue light. Note that in the sixth modification, the light emitting part 42 functions as both of a "first light emitting part" and a "second light emitting part" of the present disclosure. Further, in the sixth modification, the green corresponds to a "first color" of the present disclosure, and causing the light emitting part 42 to emit the green light from the light source 42G corresponds to "causing the first light emitting part to emit the light of the first color". Furthermore, in the sixth modification, the red corresponds to a "second color" of the present disclosure, and causing the light emitting part 42 to emit the red light from the light source 42G corresponds to "causing the second light emitting part to emit the light of the second color".

In the sixth modification, in the case that the setting of the paper sheet size has succeeded and in the case that the setting of the resolution of the image to be recorded has succeeded, the controller 80 causes the light source 42G to be turned on, without causing the light sources 42R and 42B to be turned on. With this, it is possible to cause the user to recognize that the setting of the paper sheet size has succeeded and that the setting of the resolution of the image to be recorded has succeeded. On the other hand, in the case that the setting of the paper sheet size has failed and in the case that the setting of the resolution of the image to be recorded has failed, the controller 80 causes the light source 42R to be turned on, without causing the light sources 42G and 42B to be turned on. With this, it is possible to cause the user to recognize that the setting of the paper sheet size has failed and that the setting of the resolution of the image to be recorded has failed.

Further, in the sixth modification, in a case that the setting has succeeded, it is allowable to cause either one of the light sources 42R and 42B to be turned on for a predetermined period of time; in a case that the setting has failed, it is allowable to cause the other of the light sources 42R, 42G and 42B, which is different from the one of the light sources 42R and 42B cause to be turned on in the case that the setting has succeeded, to be turned on for a predetermined period of time. Note that in this case, the color of the light emitted by the light source in the case that the setting has succeeded corresponds to the "first color" of the present disclosure, and causing the light emitting part 42 to emit the light from this light source corresponds to "causing (cause) the first light emitting part to emit the light of the first color" of the present disclosure. Further, in this case, the color of the light emitted by the light source in the case that the setting has failed corresponds to the "second color" of the present disclosure; and causing the light emitting part 42 to emit the light from this light source corresponds to "causing (cause) the second light emitting part to emit the light of the second color" of the present disclosure. Furthermore, in the sixth modification, in the processings of step S701 to S704, it is allowable to cause the light source to flash for a predetermined period of time, rather than causing the light source to be turned on for the predetermined period of time.

Further, in the above-described embodiment, it is allowable, for example, that the manner of causing the light sources 42R, 42G and 42B to flash is made to be different between the case that the setting has succeeded and the case that the setting has failed. Furthermore, in the fourth modification, it is allowable, for example, that a period of time during which the light sources 42R, 42G and 42B are caused to be turned off may be made different between the case that the setting has succeeded and the case that the setting has failed. Moreover, in the fifth modification, it is allowable, for example, that the manner of moving the reading unit 33 to be different between the case that the setting has succeeded and the case that the setting has failed.

Further, in the above-described the embodiment and the modifications, the operation for causing the user to recognize at least one of the success of the setting or the failure of the setting is performed, it is allowable that the operation(s) is (are) not performed.

Furthermore, in the above-described embodiment, the standby position and the first reading position are different. The present disclosure, however, is not limited to this. In a seventh modification, as indicated in FIG. 13A, the first reading position is same as the standby position, as indicated in solid lines; a second reading position is a position indicated by dash-dot lines in FIG. 13A, namely, a position of the reading unit 33 in a case that the reading unit 33 overlaps, in the up-down direction, with a left end part in the scanning direction of the placement surface 31a1. Further, corresponding to the above configuration, in the seventh modification, the position displaying part 37a is arranged at a part, in the upper surface 32a of the frame part 32, which is adjacent to the downstream side in the conveying direction of the ADF reading surface 31a2, as depicted in FIG. 13A. Furthermore, the position displaying part 37b is arranged at a part, in the upper surface 32a of the frame part 32, which is adjacent to the downstream side in the conveying direction of the left end part of the placement surface 31a1, as depicted in FIG. 13A. Moreover, the position displaying parts 38a and 38b are arranged at a part, in the upper surface 32a of the frame part 32, which is adjacent to a left side in the scanning direction of the ADF placement surface 31a2. Further, the position displaying parts 38c to 38e are arranged at a part, of the upper surface 32a of the frame part 32, which is adjacent to a left side in the scanning direction of the placement surface 31a1.

In the seventh modification, in a case that the controller 80 receives the setting instruction, the controller 80 performs a processing along a flow chart of For. 13B. In the flow chart of FIG. 13B, the processing of step S301 in the flow chart of FIG. 8 is omitted. Namely, in the seventh modification, the body position information obtaining processing of step S302 is executed in a state that the reading unit 33 is placed at the first reading position which is the same position as the standby position. Note that in FIG. 13B, the processings of step S305 and the steps thereafter which are similar to those in FIG. 8 are omitted from the drawing.

In the seventh modification, since the reading unit 33 is placed at the first reading position in the standby state, there is no need to move the reading unit 33 before the body position information obtaining processing of step S302. With this, it is possible to shorten a time required for setting the paper sheet size and for setting the resolution of the image to be recorded.

Further, in the above-described embodiment, although the standby position of the reading unit 33 is the position at which the light guiding body 42b and the plurality of light receiving parts 43 of the light emitting part 42 overlap, in the up-down direction, with the ADF reading surface 31a2, the standby position of the reading unit 33 may be a position different from the above-described position. For example, the standby position of the reading unit 33 may be a position at which the light guiding body 42b and the plurality of light receiving parts 43 of the light emitting part 42 overlap, in the up-down direction, with any part of the placement surface 31a1. Alternatively, the standby position of the reading unit 33 may be a position at which the light guiding body 42b and the plurality of light receiving parts 43 of the light emitting part 42 do not overlap, in the up-down direction, with both of the placement surface 31*a*1 and the ADF reading surface 31*a*2.

Furthermore, in the above-described embodiment, the controller 80 executes the body position information obtaining processing of step S302 in the state that the reading unit 33 is caused to be positioned at the first reading position in order to set the paper sheet size. Afterwards, the controller 80 executes the body position information obtaining processing of step S308, after causing the reading unit 33 to be moved from the first reading position to the second reading position, in order to set the resolution of the image to be recorded. The present disclosure, however, is not limited to this.

In an eighth modification, as depicted in FIG. 14A, the position displaying parts 38*a* to 38*e* are arranged at parts, of the upper surface 36*a* of the partition wall 36, of which positions in the scanning direction are mutually same. Further, in the eighth modification, in a case that the controller 80 receives the setting instruction, the controller 80 performs a processing along a flow chart of FIG. 14B. In the flow chart of FIG. 14B, the processing of step S301 in the flow chart of FIG. 8 is replaced with a processing of step S801 and the processing of step S306 in the flow chart of FIG. 8 is omitted. Note that in FIG. 14B, the processings of step S307 and the steps thereafter which are similar to those in FIG. 8 are omitted from the drawing.

In step S801, the controller 80 controls the second carriage motor 88 so as to move the reading unit 33 to a position indicated in FIG. 14A, namely to a reading position on the right side with respect to the position displaying parts 38*a* to 38*e*. With this, in the eighth modification, the body position information obtaining processing of each of step S302 and step S307 is executed in a state that the reading unit 33 is positioned at the reading position.

Further, in the eighth modification, the reading position may be a same position as the standby position. In this case, in the case that the controller 80 receives the setting instruction, the controller 80 may perform the processing along a flow chart from which the processing of step S801 in the flow chart of FIG. 14B is omitted.

Further, in the above-described examples, the two kinds of settings which are the setting of the paper sheet size and the setting of the resolution of the image to be recorded are performed. The present disclosure, however, is not limited to this. It is allowable, for example, to perform another setting regarding the recording of image in the recording unit 2, such as, for example, a kind of the recording sheet, etc.

Alternatively, it is allowable, for example, to perform a setting regarding each of the manuscripts R1 and R2 in the reading unit 33 such as, for example, a size of each of the manuscripts R1 and R2, a resolution of the reading, etc., in a case that each of the manuscripts R1 and R2 is read by the reading part.

Still alternatively, it is allowable, for example, to perform another setting regarding the reading the multifunction peripheral 1. The another setting regarding the multifunction peripheral 1 may be, for example, a setting regarding the electric supply to the multifunction peripheral 1 such as a setting of a standby period of time, in a case that the standby state is continued for not less than a predetermined period of time in the multifunction peripheral 1, so as to perform switching to a sleep state wherein a part of the electric supply is stopped, etc. Alternatively, the another setting regarding the multifunction peripheral 1 may be, for example, a setting regarding a consumable article such as, for example, a setting of an ink cartridge configured to supply an ink to the ink-jet head 12 of the recording unit 2. Still alternatively, in a case that the multifunction peripheral 1 is connected to a peripheral device or equipment such as a smartphone, etc., so that a communication is possible therebetween, it is also allowable to perform a setting of the peripheral device or equipment.

Further, in a case of performing any one of the above-described settings, the present disclosure is not limited to performing the two kinds of setting; it is allowable to perform only one kind of the setting, or to perform not less than three kinds of the setting.

Further, in the above-described embodiment, the two kinds of settings which are the setting of the paper sheet size and the setting of the resolution of the image to be recorded are performed independently. However, in a case of performing a plurality of kinds of settings, the present disclosure is not limited to performing the plurality of kinds of settings independently.

In a ninth modification, position displaying parts 101*a* to 101*c* are arranged on the upper surface 36*a* of the partition wall 36, as depicted in FIG. 15A. The position displaying parts 101*a* to 101*c* have positions in the scanning direction which are mutually same, and have positions in the conveying direction which are mutually different. Here, in the ninth modification, sets each of which is a set of a plurality of settings regarding the recording in the recording unit 2, such as a paper sheet size, a kind of the paper sheet, a resolution of an image to be recorded, etc., are stored, as user settings 1 to 3, in the flash memory 84. Storing the plurality of settings in each of the user settings 1 to 3 to the flash memory 84 is performed, for example, by the user operating a PC, a smartphone, etc., connected to the printer 1. Each of the position displaying parts 101*a* to 101*c* indicates a position in the conveying direction which corresponds to one of the user settings 1 to 3. Note that in the ninth modification, information in which each of the sets of the settings is made to correspond to a position corresponding to one of the user settings 1 to 3, as depicted in FIG. 15B, corresponds to "correspondence information" of the present disclosure.

In the ninth modification, in a case that the controller 80 receives the setting instruction, the controller 80 performs a processing along a flow chart of FIG. 15C. To provide a more detailed explanation, at first, the controller 80 controls the second carriage motor 88 so as to move the reading unit 33 to a reading position (step S901). The reading position in the ninth modification is a position, of the reading unit 33, which in on the right side with respect to the position displaying parts 101*a* to 101*c* and which is indicated by solid lines in FIG. 15A.

Next, the controller 80 executes a body position information obtaining processing which is similar to that in step S302 (step S902), and performs the above-described plurality of kinds of settings, based on the position of the finger F of the user obtained by the body position information obtaining processing (step S903). Specifically, in a case that a position of the finger F of the user indicated by information obtained in step S404 of the body position information obtaining processing of step S902 is one of positions indicated, respectively, by the position displaying parts 101*a* to 101*c*, the controller 80 performs the plurality of kinds of settings corresponding to one of the user settings 1 to 3. Note that, however, in a case that the position of the finger F of the user indicated by the information obtained in step S404 of the body position information obtaining processing of step S902 is none of the positions indicated, respectively, by the position displaying parts 101*a* to 101*c*, the plurality of kinds of settings fail. Then, in a case that the setting in step S903 has failed (step S904: NO), the controller 80 returns the processing to step S902. In a case that the setting in step S903 has succeeded (step S904: YES), the controller 80 executes a processing of step S905 which is similar to that of step S305 of the above-described embodiment, and ends the processing.

In the ninth modification, the plurality of kinds of settings are previously made to correspond to each of the positions of the placement surface 31a1 and are stored in the flash memory 84, thereby making it possible to perform the plurality of settings at a time.

Further, in the above-described examples, the finger F of the user placed on the reading surface 31a has a width. Accordingly, the position information of the finger F of the user obtained from the body reading data in the above-described examples is information of a range in which the finger F of the user is placed. Further, in the above-described examples, the setting of the multifunction peripheral 1 or the setting of the peripheral device(s) of the multifunction peripheral 1 is performed based on the information of the range in which the finger F of the user is placed. The present disclosure, however, is not limited to this.

In a tenth modification, in the body position information obtaining processing, the controller 80 performs a processing along a flow chart of FIG. 16. In the flow chart of FIG. 16, the controller 80 executes, after the processing of step S404 in the flow chart of FIG. 9, further a processing of step S1001.

In step S1001, the controller 80 calculates a center position in the conveying direction of the finger F of the user, based on the position information of the finger F of the user obtained in step S404. As described above, since the finger F of the user has the width, the information obtained in step S404 is the information indicating the range of the position at which the finger F of the user is placed. Note that in the tenth modification, the position information of the finger F of the user obtained in step S404 corresponds to "range information" of the present disclosure.

In step S1001, the controller 80 calculates the center position in the conveying direction of the finger F of the user from the range in the conveying direction of the finger F of the user indicated by the position information obtained in step S404. Further, in the tenth modification, the controller 80 sets, in step S303, the paper sheet size based on the center position of the finger F of the user calculated in step S1001 of the body position information obtaining processing of step S302. Further, the controller 80 sets, in step S308, the resolution of the image to be recorded, based on the center position of the finger F of the user calculated in step S1001 of the body position information obtaining processing of step S307.

Since the finger F of the user has the width as described above, for example, in a case that a position in the conveying direction of the position displaying part 38a and a position in the conveying direction of the position displaying part 38b are close to each other, and in a case that that a position in the conveying direction of one of two adjacent position displaying parts of the position displaying parts 38c to 38e and a position in the conveying direction of the other of the two adjacent position displaying parts of the position displaying parts 38c to 38e are close to each other, the finger F of the user is placed at a range over the two positions indicated by the two position displaying parts, in some cases. In such a case, there arises such a situation that the setting of the paper sheet size and the setting of the resolution of the image to be recorded cannot be performed based on the information of the range in which the finger F of the user is placed, in some cases.

In contrast, in the tenth modification, the controller 80 performs the setting of the paper sheet size and the setting of the resolution of the image to be recorded, based on the center position in the conveying direction of the finger F of the user obtained from the information of the range in which the finger F of the user is placed. With this, even in such a case that the finger F of the user is placed in the range over or across the two positions in the conveying direction which are indicated, respectively, by the two position displaying parts, it is possible to perform the setting of the paper sheet size and the setting of the resolution of the image to be recorded, based on, for example, as to whether the position of the finger F of the user is closer to which one of the two positions.

In the above-described examples, the setting of the multifunction peripheral 1 or the peripheral device(s) of the multifunction peripheral 1 is performed based only on the position itself at which the finger F of the user is placed and which is obtained from the body reading data. The present disclosure, however, is not limited to this.

In an eleventh modification, moving direction displaying parts 111a to 111d are arranged on the upper surface 36a of the partition wall 36, as depicted in FIG. 17A. Note that the position displaying parts 38a to 38e explained in the above-described embodiment are not arranged on the upper surface 36a of the partition wall 36.

The moving direction displaying parts 111a and 111b are positioned, in the scanning direction, on the left side with respect to the reading unit 33 in a state that the reading unit 33 is positioned at a position of the position displaying part 37a. Further, the moving direction displaying part 111a and the moving position displaying part 111b are arranged adjacently to each other in the conveying direction. The moving direction displaying part 111a corresponds to setting the paper sheet size to be the A4 size, and indicates a direction oriented from the downstream side toward the upstream side of the conveying direction. The moving direction displaying part 111b corresponds to setting the paper sheet size to be the A5 size, and indicates a direction oriented from the upstream side toward the downstream side of the conveying direction.

The moving direction displaying parts 111c and 111d are positioned, in the scanning direction, on the left side with respect to the reading unit 33 in a state that the reading unit 33 is positioned at a position of the position displaying part 37b. Further, the moving direction displaying part 111c and the moving position displaying part 111d are arranged adjacently to each other in the conveying direction. The moving direction displaying part 111c corresponds to setting the resolution of the image to be recorded to be 300 dpi, and indicates the direction oriented from the downstream side toward the upstream side of the conveying direction. The moving direction displaying part 111d corresponds to setting the resolution of the image to be recorded to be 200 dpi, and indicates the direction oriented from the upstream side toward the downstream side of the conveying direction. Note that in the eleventh modification, the direction oriented from the downstream side toward the upstream side of the conveying direction corresponds to a "fourth direction" of the present disclosure, and the direction oriented from the upstream side toward the downstream side of the conveying direction corresponds to a "fifth direction" of the present disclosure.

In the eleventh modification, in the case that the controller 80 receives the setting instruction signal, the controller 80 performs the processing along the flow chart of FIG. 8, similarly to the above-described embodiment. Note that, however, in the body position information obtaining processing in the eleventh modification, the controller 80 performs the processing along a flow chart of FIG. 17B, unlike the above-described embodiment. In the flow chart of FIG. 17B, the processing of step S403 and the processing of step S404 in the flow chart of FIG. 9 are replaced, respectively, with a processing of step S1101 and a processing of step S1102.

To provide a more detailed explanation, after the controller 80 executes the processing of step S401 and the processing of step S402 of the above-described embodiment, the controller 80 determines as to whether or not the finger F of the user has moved, based on the body reading data (step S1101). More specifically, the controller 80 determines as to whether or not there is a so-called flick operation in which the user touches the placement surface 31*a*1 with his or her finger and then the user moves his or her finger F. In this situation, in a case that the finger F of the user is moved in the conveying direction on an area indicated by the position displaying parts 37*a* and 37*b*, a value of a signal outputted from a certain light receiving part 43 corresponding to the above-described area is changed from a value in a case that the finger F of the user is not placed. Further, a value of a signal outputted from another light receiving part 43 adjacent to the certain light receiving part 43 is changed from a value in a case that the finger F of the user is not placed to a value in a case that the finger F of the user is placed. On the other hand, in a case that the finger F of the user is not moved in the conveying direction on the area indicated by the position displaying parts 37*a* and 37*b* in the placement surface 31*a*1, the above-described change does not occur in the values of the signal outputted from the light receiving parts 43 as described above. In view of this, in step S1101, the controller 80 determines as to whether or not the finger F of the user has moved, based on whether or not the body reading data indicates that the above-described changes occur in the values of the signals outputted from the light receiving parts 43 as described above.

In a case that the finger F of the user has not moved (step S1101: NO), the controller 80 returns the processing to step S401. In a case that the finger F of the user has moved (step S1101: YES), the controller 80 obtains position information indicating the position in the conveying direction of the finger F of the user and movement information indicating a moving direction of the finger F of the user, based on the body reading data (step S1102). The position information of the finger F of the user is, for example, information of a position immediately before the finger F of the user is moved.

Further, for example, in a case that the body reading data indicates that a value of a signal outputted from a certain light receiving part 43 corresponding to the above-described area on which the finger F of the user is placed is changed from a value in a case that the finger F of the user is placed to a value in a case that the finger F of the user is not placed and that a value of a signal outputted from another light receiving part 43 which is adjacent to the certain light receiving part 43 on the upstream side in the conveying direction is changed from a value in the case that the finger F of the user is not placed to a value in the case that the finger F of the user is placed, the controller 80 obtains, in step S1102, information indicating that the finger F of the user is moved in the direction from the downstream side toward the upstream side in the conveying direction.

Furthermore, for example, in a case that the body reading data indicates that a value of a signal outputted from a certain light receiving part 43 corresponding to the above-described area on which the finger F of the user is placed is changed from a value in a case that the finger F of the user is placed to a value in a case that the finger F of the user is not placed and that a value of a signal outputted from another light receiving part 43 which is adjacent to the certain light receiving part 43 on the downstream side in the conveying direction is changed from a value in the case that the finger F of the user is not placed to a value in the case that the finger F of the user is placed, the controller 80 obtains, in step S1102, information indicating that the finger F of the user is moved in the direction from the upstream side toward the downstream side in the conveying direction.

Moreover, in the eleventh modification, the controller 80 sets, in step S303, the sheet size to be the A4 size in a case that a position of the finger F of the user indicated by the information, which is obtained in the processing of step S1102 of the body position information obtaining processing of step S302, is within a predetermined range including the position in the conveying direction at which the moving direction displaying parts 111*a* and 111*b* are arranged and that a moving direction of the finger F of the user, which is indicated by this information, is the direction from the downstream side toward the upstream side in the conveying direction. Further, in the eleventh modification, the controller 80 sets, in step S303, the sheet size to be the A5 size in a case that the position of the finger F of the user indicated by the information, which is obtained in the processing of step S1102 of the body position information obtaining processing of step S302, is within the predetermined range including the position in the conveying direction at which the moving direction displaying parts 111*a* and 111*b* are arranged and that the moving direction of the finger F of the user, which is indicated by this information, is the direction from the upstream side toward the downstream side in the conveying direction.

Note that in the eleventh modification, for example, in a case that the finger F of the user is moved at a position outside the predetermined range including the position in the conveying direction, at which the moving direction displaying parts 111*a* and 111*b* are arranged, during the body position information obtaining processing of step S302, the setting of the sheet size fails in step S303.

Further, in the eleventh modification, the controller 80 sets, in step S308, the resolution of the image to be recorded to be 300 dpi in a case that a position of the finger F of the user indicated by the information, which is obtained in the processing of step S1102 of the body position information obtaining processing of step S307, is within a predetermined range including the position in the conveying direction at which the moving direction displaying parts 111*c* and 111*d* are arranged and that the moving direction of the finger F of the user, which is indicated by this information, is the direction from the downstream side toward the upstream side in the conveying direction. Furthermore, in the eleventh modification, the controller 80 sets, in step S308, the resolution of the image to be recorded to be 200 dpi in a case that the position of the finger F of the user indicated by the information, which is obtained in the processing of step S1102 of the body position information obtaining processing of step S307, is within the predetermined range including the position in the conveying direction at which the moving direction displaying parts 111*c* and 111*d* are arranged and that the moving direction of the finger F of the user, which is indicated by this information, is the direction from the upstream side toward the downstream side in the conveying direction.

Note that in the eleventh modification, for example, in a case that the finger F of the user is moved at a position outside the predetermined range including the position in the conveying direction at which the moving direction displaying parts 111c and 111d are arranged during the body position information obtaining processing of step S307, the setting of the resolution of the image to be recorded fails in step S308.

Further, in the eleventh modification, "setting the sheet size to be the A4 size" and "setting the resolution of the image to be recorded to be 300 dpi" each correspond to "make the setting to be a fifth setting" of the present disclosure, and "setting the sheet size to be the A5 size" and "setting the resolution of the image to be recorded to be 200 dpi" each correspond to "make the setting to be a sixth setting" of the present disclosure.

In the eleventh modification, it is possible to make the setting of the sheet size and to make the setting of the resolution of the image to be recorded, based on the moving direction of the finger F of the user on the placement surface 31a1 (a so-called flick operation).

Further, in this situation, it is possible to make the setting of the multifunction peripheral 1 or the setting of the peripheral device(s) of the multifunction peripheral 1 to be the fifth setting by a simple operation of reading, by the reading unit 33, the finger F of the user moved in the fourth direction. Furthermore, it is possible to make the setting of the multifunction peripheral 1 or the setting of the peripheral device(s) of the multifunction peripheral 1 to be the sixth setting by a simple operation of reading, by the reading unit 33, the finger F of the user moved in the fifth direction.

Moreover, in the eleventh modification, it is allowable to arrange a plurality of sets each being a set of one of a plurality of pieces of the moving direction displaying part 111a and one of a plurality of pieces of the moving direction displaying part 111b of which positions in the scanning directions are mutually same and of which positions in the conveying direction are mutually different. Further, it is allowable to make the setting of the multifunction peripheral 1 or the setting of the peripheral device(s) of the multifunction peripheral 1, based on as to the finger F of the user is moved at which position having which one of the sets of the moving direction displaying part 111a and the moving direction displaying part 111b arranged thereon and based on the moving direction of the finger F of the user. Similarly, in the eleventh modification, it is allowable to arrange a plurality of sets each being a set of one of a plurality of pieces of the moving direction displaying part 111c and one of a plurality of pieces of the moving direction displaying part 111d of which positions in the scanning directions are mutually same and of which positions in the conveying direction are mutually different. Further, it is allowable to make the setting of the multifunction peripheral 1 or the setting of the peripheral device(s) of the multifunction peripheral 1, based on as to the finger F of the user is moved at which position having which one of the sets of the moving direction displaying part 111c and the moving direction displaying part 111d arranged thereon and based on the moving direction of the finger F of the user.

Furthermore, in the eleventh modification, it is allowable to provide a configuration wherein the plurality of light receiving parts 43 of the reading unit 33 are arranged in a grid-like shape in the conveying direction and the scanning direction. Moreover, it is allowable to obtain the information of the moving direction of the finger F of the user, regarding the conveying direction and the scanning direction, based on a change in the values of the signals outputted from the plurality of light receiving parts 43. Further, it is also allowable to make the setting of the multifunction peripheral 1 or the setting of the peripheral device(s) of the multifunction peripheral 1, based on the information of the moving direction of the finger F of the user.

In a twelfth modification, position displaying parts 121a and 121b are arranged on the upper surface 36a of the partition wall 36, as depicted in FIG. 18A. Note that the position displaying parts 38a to 38e explained in the above-described embodiment are not arranged on the upper surface 36a of the partition wall 36.

The position displaying part 121a is positioned, in the scanning direction, on the left side with respect to the reading unit 33 in a state that the reading unit 33 is positioned at a position indicated by the position displaying part 37a. The position displaying part 121b is positioned, in the scanning direction, on the left side with respect to the reading unit 33 in a state that the reading unit 33 is positioned at a position indicated by the position displaying part 37b.

In the twelfth modification, in the case that the controller 80 receives the setting instruction signal, the controller 80 performs the processing along the flow chart of FIG. 8, similarly to the above-described embodiment. Note that, however, in the body position information obtaining processing of the twelfth modification, the controller 80 performs a processing along a flow chart of FIG. 18B, unlike the above-described embodiment.

To provide a more detailed explanation regarding the flow chart of FIG. 18B, the controller 80 executes, in the body position information obtaining processing, the processings of steps S401 to S404, in a similar manner as in the above-described embodiment. After the controller 80 executes the processing of step S404, the controller 80 determines, based on the body reading data, as to whether or not a light receiving part 43 which outputs a signal indicating the color components of the lights within a predetermined range outputs this signal continuously for not less than a predetermined period of time (step S1201). In a case that this light receiving part 43 continuously outputs this signal for not less than the predetermined period of time (step S1201: YES), the controller 80 obtains long-press information indicating that the position, at which the finger F of the user is placed, obtained in the processing of step S404 is long pressed (step S1202), and the controller 80 returns the processing to the flow chart of FIG. 8. In a case that this light receiving part 43 does not continuously output this signal for not less than the predetermined period of time (step S1201: NO), the controller 80 obtains tap information indicating that the position, at which the finger F of the user is placed, obtained in the processing of step S404 is tapped (step S1203), and the controller 80 returns the processing to the flow chart of FIG. 8. Here, the term "tapped" or "tap", etc., means that the finger F of the user is placed on the placement surface 31a1 and then is separated from the placement surface 31a1 before the predetermined time elapses.

Further, in the twelfth modification, the controller 80 sets, in step S303, the sheet size to be the A4 size in a case that a position, at which the finger F of the user is placed, obtained in the processing of step S404 of the body position information obtaining processing of step S302 is the position of the position displaying part 121a and that the long press information of step S1202 is obtained in the body position information obtaining processing of step S302. Furthermore, in the twelfth modification, the controller 80 sets, in step S303, the sheet size to be the A5 size in a case that the position, at which the finger F of the user is placed, obtained in the processing of step S404 of the body position information obtaining processing of step S302 is the position of the position displaying part 121a and that the tap information of step S1203 is obtained in the body position information obtaining processing of step S302.

Note that in the twelfth modification, for example, in a case that another position which is different from the position, in the placement surface 31a1, indicated by the position displaying part 121a is long pressed or tapped by the finger F of the user during the body position information obtaining processing of step S302, the setting of the sheet size fails in step S303.

Moreover, in the twelfth modification, the controller 80 sets, in step S308, the resolution of the image to be recorded to be 300 dpi in a case that a position, at which the finger F of the user is placed, obtained in the processing of step S404 of the body position information obtaining processing of step S307 is the position indicated by the position displaying part 121b and that the long press information of step S1202 is obtained in the body position information obtaining processing of step S307. Furthermore, in the twelfth modification, the controller 80 sets, in step S308, the resolution of the image to be recorded to be 200 dpi in a case that the position, at which the finger F of the user is placed, obtained in the processing of step S404 of the body position information obtaining processing of step S307 is the position indicated by the position displaying part 121b and that the tap information of step S1203 is obtained in the body position information obtaining processing of step S307.

Note that in the twelfth modification, for example, in a case that another position which is different from the position, in the placement surface 31a1, indicated by the position displaying part 121b is long pressed or tapped by the finger F of the user during the body position information obtaining processing of step S307, the setting of the resolution of the image to be recorded fails in step S308.

Further, in the twelfth modification, "setting the sheet size to be the A4 size" and "setting the resolution of the image to be recorded to be 300 dpi" each correspond to "make the setting to be a seventh setting" of the present disclosure, and "setting the sheet size to be the A5 size" and "setting the resolution of the image to be recorded to be 200 dpi" each correspond to "make the setting to be an eighth setting" of the present disclosure.

In the twelfth modification, it is possible to make the setting of the multifunction peripheral 1 or the setting of the peripheral device(s) of the multifunction peripheral 1 to be the seventh setting by a simple operation of reading, by the reading unit 33, the finger F of the user placed on the placement surface 31a1 for not less than the predetermined period of time. Further, it is possible to make the setting of the multifunction peripheral 1 or the setting of the peripheral device(s) of the multifunction peripheral 1 to be the eighth setting by a simple operation of reading, by the reading unit 33, the finger F of the user tapped on the placement surface 31a1, namely, the finger F of the user placed on the placement surface 31a1 and then separated from the placement surface 31a1 before the predetermined period of time lapses.

Furthermore, in the twelfth modification, it is allowable to arrange a plurality of pieces of the position displaying part 121a of which positions in the scanning directions are mutually same and of which positions in the conveying direction are mutually different. Moreover, it is allowable to perform the setting of the multifunction peripheral 1 or the setting of the peripheral device(s) of the multifunction peripheral 1, based on as to the finger F of the user is placed at a position indicated by which one of the position displaying parts 121a, and based on whether or not a period of time during which the finger F of the user is placed at the above-described position is longer than a predetermined time. Similarly, it is allowable to arrange a plurality of pieces of the position displaying part 121b of which positions in the scanning directions are mutually same and of which positions in the conveying direction are mutually different. Further, it is allowable to perform the setting of the multifunction peripheral 1 or the setting of the peripheral device(s) of the multifunction peripheral 1, based on as to the finger F of the user is placed at a position indicated by which one of the position displaying parts 121b, and based on whether or not a period of time during which the finger F of the user is placed at the above-described position is longer than the predetermined time.

Furthermore, for example, it is also allowable to provide such a configuration wherein in a case that the finger F of the user is placed at a certain position of the placement surface 31a1, the setting of the multifunction peripheral 1 or the setting of the peripheral device(s) of the multifunction peripheral 1 is performed based on the certain position, similarly to the above-described embodiment; whereas in a case that the finger F of the user is moved at another position different from the certain position of the placement surface 31a1, the setting of the multifunction peripheral 1 or the setting of the peripheral device(s) of the multifunction peripheral 1 is performed based on the moving direction of the finger F of the user, similarly to the eleventh modification.

Alternatively, it is also allowable to provide such a configuration wherein in a case that the finger F of the user is placed at a certain position of the placement surface 31a1, the setting of the multifunction peripheral 1 or the setting of the peripheral device(s) of the multifunction peripheral 1 is performed based on the certain position, similarly to the above-described embodiment; whereas in a case that another position different from the certain position of the placement surface 31a1 is long pressed or tapped by the finger F of the user, the setting of the multifunction peripheral 1 or the setting of the peripheral device(s) of the multifunction peripheral 1 is performed based on whether the another position is long pressed or tapped by the finger F of the user, similarly to the twelfth modification.

Still alternatively, it is also allowable to provide such a configuration wherein in a case that the finger F of the user is moved at a certain position of the placement surface 31a1, the setting of the multifunction peripheral 1 or the setting of the peripheral device(s) of the multifunction peripheral 1 is performed based on the moving direction of the finger F of the user, similarly to the eleventh modification; whereas in a case that another position different from the certain position of the placement surface 31a1 is long pressed or tapped by the finger F of the user, the setting of the multifunction peripheral 1 or the setting of the peripheral device(s) of the multifunction peripheral 1 is performed, based on whether the another position is long pressed or tapped by the finger F of the user, similarly to the twelfth modification.

Alternatively, it is also allowable to provide such a configuration wherein in a case that the finger F of the user is placed at a certain position of the placement surface 31a1, the setting of the multifunction peripheral 1 or the setting of the peripheral device(s) of the multifunction peripheral 1 is performed based on the certain position, similarly to the above-described embodiment; whereas in a case that the finger F of the user is moved at another position different from the certain position of the placement surface 31a1, the setting of the multifunction peripheral 1 or the setting of the peripheral device(s) of the multifunction peripheral 1 is performed based on the moving direction of the finger F of the user, similarly to the eleventh modification; and whereas in a case that yet another position different from the certain position and the another position of the placement surface 31a1 is long pressed or tapped by the finger F of the user, the setting of the multifunction peripheral 1 or the setting of the peripheral device(s) of the multifunction peripheral 1 is performed based on whether the yet another position is long pressed or tapped by the finger F of the user, similarly to the twelfth modification.

Further, there is such a case that the value of the signal outputted from each of the light receiving parts 43 in the case that the body reading operation is performed as explained above is changed, in some cases, depending on the ambient (surrounding) brightness of a place in which the multifunction peripheral 1 is installed.

In view of the above situation, in a thirteenth modification, for example in the above-described embodiment, before the controller 80 starts the processing along the flow chart of FIG. 8, the controller 80 performs a processing along a flow chart of FIG. 19A. Here, the phrase "before (the controller 80) starts the processing along the flow chart of FIG. 8" may be a period of time since the setting instruction is received and until the processing along the flow chart of FIG. 8 is started, or may be a period of time before the setting instruction is received.

To provide an explanation regarding the flow chart of FIG. 19A, the controller 80 executes the body reading processing in a state that the cover 34 is positioned at the open position and that neither of the manuscript R1 and the finger F of the user is placed on the placement surface 31a1, thereby causing the reading unit 33 to perform the body reading processing (step S1301). Subsequently, the controller 80 obtains first reference reading data based on the signals received from the plurality of light receiving parts 43 in a case that the body reading operation is performed by the body reading processing of step S1301, and causes the flash memory 84 to store the obtained first reference reading data (step S1302).

As described above, there is such a case that the ambient brightness varies (is changed) depending on the place at which the multifunction peripheral 1 is placed, whereby the value of the signal outputted from each of the light receiving parts 43 in the case that the body reading operation is performed is changed, in some cases. In view of the above situation, in the thirteenth modification, the controller 80 obtains, in advance, the first reference reading data and causes the flash memory 84 to store the first referenced reading data, and the controller 80 performs the setting of the multifunction peripheral 1 or the setting of the peripheral device(s) of the multifunction peripheral 1 based on the body reading data and the first reference reading data, as described above. For example, the controller 80 performs the setting of the predetermined range of the embodiment and the first modification and the setting of the predetermined amount of the second and third modifications, as described above, based on the first reference reading data. With this, it is possible to perform the setting of the multifunction peripheral 1 or the setting of the peripheral device(s) of the multifunction peripheral 1, without being affected by the ambient brightness of the place in which the multifunction peripheral 1 and the peripheral device(s) of the multifunction peripheral 1 are installed, etc.

Further, in a case of performing the body reading operation with the reading unit 33 in a state that the finger F of the user is placed on the reading surface 31a (the placement surface 31a1 or the ADF reading surface 31a2), a value of the signal outputted from a light receiving part 43 corresponding to the position at which the finger F of the user is placed becomes to be a value in accordance with the color of the finger F of the user. On the other hand, the color of the finger F of the user differs person to person.

In view of the above situation, in a fourteenth modification, for example, before the controller 80 starts the processing along the flow chart of FIG. 8 in the above-described embodiment, the controller 80 performs a processing along a flow chart of FIG. 19B. In the fourteenth modification, the phrase "before (the controller 80) starts the processing along the flow chart of FIG. 8" is similar to that explained regarding the tenth modification.

To provide an explanation regarding the flow chart of FIG. 19B, the controller 80 executes the body reading processing in a state that the cover 34 is positioned at the open position and that the finger F of the user is placed at a predetermined position on the placement surface 31a1, thereby causing the reading unit 33 to perform the body reading processing (step S1401). In this situation, the controller 80 controls the second carriage motor 88 so as to cause the reading unit 33 to perform the body reading processing in a state that the reading unit 33 is positioned such that a position in the scanning direction of each of the light guiding part 42b and the plurality of light receiving parts 43 of the light emitting part 42 is to be the predetermined position.

Subsequently, the controller 80 obtains second reference reading data based on a signal received from a light receiving part 43 which corresponds to the predetermined position in a case that the body reading operation is performed by the body reading processing of step S1401, and causes the flash memory 84 to store the obtained second reference reading data (step S1402).

Further, in the fourteenth modification, the controller 80 performs a processing along a flow chart of FIG. 19C in the body position information obtaining processing. In the flow chart of FIG. 19C, the processing of step S403 in the flow chart of FIG. 9 is replaced with a processing of step S1403.

In step S1403, the controller 80 determines, based on the body reading data and the second reference reading data, as to whether or not there is present a light receiving part 43 in which a difference between a value of a signal outputted therefrom and a reference value indicated by the second reference reading data is not more than a predetermined amount.

In a case that there is not present any light receiving part 43 in which the difference between the value of the signal outputted therefrom and the reference value indicated by the second reference reading data is not more than the predetermined amount (step S1403: NO), the controller 80 returns the processing to step S401. In a case that there is present a light receiving part 43 in which the difference between the value of the signal outputted therefrom and the reference value indicated by the second reference reading data is not more than the predetermined amount (step S1403: YES), the controller 80 proceeds the processing to step S404 and obtains information of the position of the finger F of the user. Note, however, that in the fourteenth modification, the controller 80 obtains the information of the position in the conveying direction of the finger F of the user, based on the position in the conveying direction of the light receiving part 43 in which the difference between the value of the signal outputted therefrom and the reference value indicated by the second reference reading data is not more than the predetermined amount.

As described above, the color of the finger F of the user varies person to person. Therefore, in a case that the body reading operation is performed, there is such a case that the value of the signal outputted from the light receiving part 43 might be different, due to the difference in the color of the finger F of the user. In view of this situation, in the fourteenth modification, the controller 80 obtains the second reference reading data in accordance with the color of the finger F of the user in advance, causes the flash memory 84 to store the obtained second reference reading data, and performs the setting of the multifunction peripheral 1 or the setting of the peripheral device(s) of the multifunction peripheral 1, based on the body reading data and the second reference reading data, as described above. With this, it is possible to perform the setting of the multifunction peripheral 1 or the setting of the peripheral device(s) of the multifunction peripheral 1, without being affected by the individual difference of the color of the finger F of the user.

Further, in the above-described embodiment, in a case that it is determined, in step S304, that the setting of the sheet size succeeds, the reading unit 33 is moved from the first reading position to the second reading position, without any operation of the user. The present disclosure, however, is not limited to or restricted by this. For example, it is allowable to move the reading unit 33 from the first reading position to the second reading position in a case that it is determined that the setting of the sheet size succeeds in step S304 and that a predetermined operation is performed by the user in the operating part 7.

Furthermore, in the above-described examples, although the position displaying part configured to indicate the position at which the finger F of the user is (to be) placed is arranged at least one of the upper surface 36a of the partition wall 36 and the surface 32a of the frame part 32, the present disclosure is not limited to this. The position displaying part may be arranged at another position in the multifunction peripheral. Further, the position displaying part may be omitted.

Moreover, in the above-described examples, although the user performs the operation in which the user places the finger F of the user himself or herself on the reading surface 31a in the state that the cover 34 is positioned at the open position and that the reading surface 31a is exposed, the present disclosure is not limited to this. For example, it is allowable that a through hole is defined in a part, of the cover 34, which overlaps in the up-down direction with a part, of the reading surface 31a, at which the finger F of the user is (to be) placed in a state that the cover 34 is positioned at the closed position, and that the part, of the reading surface 31a, at which the finger F of the user is (to be) placed is exposed even in a case that the cover 34 is positioned at the closed position. Further, the user may perform an operation in which the user places the finger F of the user on the reading surface 31a, via the through hole of the cover 34, in the state that the cover 34 is positioned at the closed position.

Further, in the above-described examples, although the user performs the operation of placing the finger F of the user on the reading surface 31a, and the controller 80 performs the setting of the multifunction peripheral 1 or the setting of the peripheral device(s) of the multifunction peripheral 1, based on the position, on the reading surface 31a, at which the finger F of the user is placed, etc., the present disclosure is not limited to this. For example, it is allowable that the user performs an operation of placing a part of the body of the user, for example, the palm, etc., which is different from the finger F of the user, on the reading surface 31a, and that the controller 80 performs the setting of the multifunction peripheral 1 or the setting of the peripheral device(s) of the multifunction peripheral 1, based on the position, on the reading surface 31a, at which the part of the body of the user is placed. Alternatively, for example, it is allowable that the user performs an operation of placing a member such as a touch pen, etc., on the reading surface 31a, and that the controller 80 performs the setting of the multifunction peripheral 1 or the setting of the peripheral device(s) of the multifunction peripheral 1, based on the position, on the reading surface 31a, at which the member is placed.

Furthermore, Further, in the above-described examples, although the recording unit is the ink-jet printer which is configured to discharge or eject the ink(s) from the nozzles 10 so as to perform the recording, the present disclosure is not limited to this. For example, the recording unit may be a laser printer.

Moreover, in the above-described examples, although the explanation has been given about the example wherein the present disclosure is applied to the multifunction peripheral as the image recording apparatus provided with the recording unit, in addition to the reading unit, the present disclosure is not limited to this. For example, it is also possible to apply the present disclosure to an image reading apparatus which is provided with a reading unit, and which is not provided with a recording unit. Also in this case, it is possible of perform the setting of the image reading apparatus and the setting of a peripheral device which is connected to the image reading apparatus so that the communicating can be performed therebetween, by a simple operation which is similar to that as described above.

Further, it is also possible to apply the present disclosure to an apparatus provided with a reading unit which is provided with a reading unit and which is different from the image recording apparatus and the image reading apparatus. Also in this case, it is possible of perform the setting of the apparatus provided with the reading unit and the setting of a peripheral device which is connected to the apparatus provided with the reading unit so that the communicating can be performed therebetween, by a simple operation which is similar to that as described above.

What is claimed is:

1. An apparatus comprising:
    a reading surface;
    a reading unit configured to read a manuscript on the reading surface;
    a position displaying part; and
    a controller,
    wherein the controller is configured to:
        cause the reading unit to perform a body reading operation of reading a part, of a body of a user, positioned on the reading surface; and
        perform a setting of the apparatus or of a peripheral device configured to communicate with the apparatus, based on body reading data obtained from a result of a reading of the reading unit in a case of causing the reading unit to perform the body reading operation, and
    wherein the position displaying part is configured to indicate a position, in the reading surface, corresponding to a content of the setting.

2. The apparatus according to claim 1, further comprising a recording unit configured to perform a recording of an image.

3. The apparatus according to claim 1, wherein the apparatus is an image reading apparatus configured to read an image recorded on the manuscript.

4. The apparatus according to claim 1, wherein in a case that the controller receives a first instruction, the controller is configured to cause the reading unit to perform a manuscript reading operation of reading the manuscript, and to generate image data of an image recorded on the manuscript based on manuscript reading data obtained from a result of a reading of the reading unit in a case of causing the reading unit to perform the manuscript reading operation, and in a case that the controller receives a second instruction which is different from the first instruction, the controller is configured to cause the reading unit to perform the body reading operation, and to perform the setting based on the body reading data.

5. The apparatus according to claim 1, wherein the reading unit has a cover movable between a closed position at which the cover covers the reading surface and an open position at which the cover exposes the reading surface, and the controller is configured to cause the reading unit to perform the body reading operation in a state that the cover is positioned at the open position.

6. The apparatus according to claim 1, wherein the reading unit extends in a first direction, the reading surface extends in the first direction, and the controller is configured to:

make the setting to be a first setting in a case that the body reading data indicates that the part of the body of the user placed on the reading surface is positioned at a first position in the first direction; and make the setting to be a second setting which is different from the first setting in a case that the body reading data indicates that the part of the body of the user placed on the reading surface is positioned at a second position, which is different from the first position, in the first direction.

7. The apparatus according to claim 1, wherein the reading surface extends in a second direction, the reading unit is configured to move to a first reading position and a second reading position in the second direction, and the controller is configured to:

cause the reading unit to perform a first body reading operation in a case that the reading unit is positioned at the first reading position, and to make the setting to be a third setting, in a case that the body reading data obtained in the first body reading operation indicates that the part of the body of the user placed on the reading surface is positioned at a third position in the second direction; and cause the reading unit to perform a second body reading operation in a case that the reading unit is positioned at the second reading position, and to make the setting to be a fourth setting, in a case that the body reading data obtained in the second body reading operation indicates that the part of the body of the user placed on the reading surface is positioned at a fourth position in the second direction.

8. The apparatus according to claim 7, wherein the reading unit is positioned at the first reading position in a case that the reading unit is in a standby state.

9. The apparatus according to claim 7, wherein after the first body reading operation is completed, the controller is configured to cause the reading unit to move from the first reading position to the second reading position, without an operation by the user.

10. The apparatus according to claim 1, further comprising:

a placement stand which is transparent and which forms the reading surface; and a first surface which is formed with a spacing distance with respect to the placement stand in a third direction orthogonal to the reading surface, wherein the reading unit is arranged between the placement stand and the first surface in the third direction, and the position displaying part is arranged in the first surface.

11. The apparatus according to claim 1, further comprising a frame part configured to surround a periphery of the reading surface, wherein the position displaying part is arranged in a surface of the frame part.

12. The apparatus according to claim 1, wherein the controller is configured to:

obtain movement information based on the body reading data, the movement information being information of a moving direction of the part of the body of the user in a case that the user moves the part of the body on the reading surface; and perform the setting based on the moving direction of the part of the body indicated by the movement information.

13. The apparatus according to claim 12, wherein the part of the body of the user is a finger of the user.

14. The apparatus according to claim 13, wherein in a case that the moving direction of the finger indicated by the movement information is a fourth direction, the controller is configured to make the setting to be a fifth setting, and in a case that the moving direction of the finger indicated by the movement information is a fifth direction which is different from the fourth direction, the controller is configured to make the setting to be a sixth setting which is different from the fifth setting.

15. The apparatus according to claim 13, wherein in a case that the movement information indicates that the finger is placed on the reading surface for not less than a predetermined period of time, the controller is configured to make the setting to be a seventh setting, and in a case that the movement information indicates that after the finger has been placed on the reading surface and then is separated from the reading surface before the predetermined period of time elapses, the controller is configured to make the setting to be an eighth setting which is different from the seventh setting.

16. The apparatus according to claim 1, wherein the controller is configured to:

obtain position information based on the body reading data, the position information being information of a position of an edge of the part of the body of the user; and perform the setting based on the position information.

17. The apparatus according to claim 2, wherein the controller is configured to perform a setting regarding a recording in the recording unit, based on the body reading data.

18. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading unit has:

a light emitting part configured to emit light toward the reading surface; and a light receiving part configured to receive the light and to output, to the controller, a signal having a value corresponding to a characteristic of the light received by the light receiving part, and the controller is configured to:

cause the reading unit to perform the body reading operation by causing the light emitting part to emit the light;

obtain the body reading data based on the value of the signal outputted from the light receiving part; and cause the light emitting part to emit the light, based on at least one of a success or a failure of the setting based on the body reading data, in an aspect different from that in the body reading operation.

19. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading unit has:

a light emitting part configured to emit light toward the reading surface; and a light receiving part configured to receive the light and to output, to the controller, a signal having a value corresponding to a characteristic of the light received by the light receiving part, and the controller is configured to:

cause the reading unit to perform the body reading operation by causing the light emitting part to emit the light;

obtain the body reading data based on the value of the signal outputted from the light receiving part; and cause the light emitting part to stop emitting of the light based on at least one of a success or a failure of the setting based on the body reading data.

20. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading unit is configured to be movable, and the controller is configured to move the reading unit based on at least one of a success or a failure of the setting based on the body reading data.

21. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading unit has:

a first light emitting part configured to emit a first light of a first color toward the reading surface;

a second light emitting part configured to emit a second light of a second color, which is different from the first color, toward the reading surface; and a light receiving part configured to receive light to output, to the controller, a signal having a value corresponding to a characteristic of the light received by the light receiving part, and the controller is configured to:

obtain the body reading data based on the value of the signal outputted from the light receiving part;

cause the first light emitting part to emit the first light of the first color without causing the second light emitting part to emit the second light of the second color, in a case that the setting based on the body reading data has succeeded; and cause the second light emitting part to emit the second light of the second color without causing the first light emitting part to emit the first light of the first color, in a case that the setting based on the body reading data has failed.

22. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading surface extends in a first direction, the reading unit has:

a light emitting part extending in the first direction and configured to emit a plurality of colors of light; and a plurality of light receiving parts which are arranged side by side in the first direction and each of which is configured to receive the plurality of colors of light and to output, to the controller, a signal having a value corresponding to a plurality of color components of light received by each of the light receiving parts, and the controller is configured to:

obtain the body reading data based on the value of the signal outputted from each of the light receiving parts;

obtain position information as information of a position at which the part of the body of the user is placed on the reading surface, based on a position in the first direction of a light receiving part, of the light receiving parts, in which the body reading data indicates that the plurality of color components of the light is within a predetermined range; and perform the setting based on the position information.

23. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading surface extends in a first direction; the reading unit has:

a light emitting part extending in the first direction and configured to emit light toward the reading surface; and a plurality of light receiving parts which are arranged side by side in the first direction and each of which is configured to receive the light and to output, to the controller, a signal having a value corresponding to a brightness of the light received by each of the light receiving parts, and the controller is configured to:

obtain the body reading data based on the value of the signal outputted from each of the light receiving parts;

obtain position information as information of a position at which the part of the body of the user is placed on the reading surface, based on a position in the first direction of a light receiving part, of the light receiving parts, in which the body reading data indicates that the brightness is within a predetermined range; and perform the setting based on the position information.

24. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading surface extends in a first direction; the reading unit has:

a light emitting part extending in the first direction and configured to emit light toward the reading surface; and a plurality of light receiving parts which are arranged side by side in the first direction and each of which is configured to output, to the controller, a signal having a value corresponding to a characteristic of the light received by each of the light receiving parts, and the controller is configured to:

cause the light emitting part to continue emission of the light toward the reading surface in the body reading operation;

obtain the body reading data based on the value of the signal outputted from each of the light receiving parts;

obtain position information as information of a position at which the part of the body of the user is placed on the reading surface, based on a position in the first direction of a light receiving part, of the light receiving parts, in which the body reading data indicates that the value of the signal outputted therefrom is changed by not less than a predetermined amount; and perform the setting based on the position information.

25. An apparatus comprising:

a reading surface;

a reading unit configured to read a manuscript on the reading surface; and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, and wherein the reading surface extends in a first direction, the reading unit extends in the first direction, and the controller is configured to:

obtain range information as information of a range in which the part of the body of the user is placed, based on the body reading data; and perform the setting based on a center position in the first direction in the range indicated by the range information.

26. An apparatus comprising:

a reading surface;

a reading unit configured to read a manuscript on the reading surface;

a memory, and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, wherein the memory is configured to store correspondence information in which each of a plurality of positions in the reading surface is made to correspond to one of a plurality of kinds of the setting of the apparatus, and wherein the controller is configured to:

obtain position information as information of a position at which the part of the body of the user is placed in the reading surface, based on the body reading data; and perform the plurality of kinds of the setting of the apparatus, based on the position information and the correspondence information.

27. An apparatus comprising:

a reading surface;

a reading unit configured to read a manuscript on the reading surface;

a memory, and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, wherein the controller is configured to:

cause the reading unit to perform the body reading operation in a state that neither of the part of the body of the user and the manuscript is placed on the reading surface and to cause the memory to store first reference reading data which is obtained from a result of a reading performed by the reading unit in a case of causing the reading unit to perform the body reading operation; and perform the setting based on the body reading data and the first reference reading data.

28. An apparatus comprising:

a reading surface;

a reading unit configured to read a manuscript on the reading surface;

a memory, and a controller, wherein the controller is configured to:

cause the reading unit to perform a body reading operation of reading a part, of a body of a user, positioned on the reading surface; and perform a setting of the apparatus or of a peripheral device configured to communicate with the apparatus, based on body reading data obtained from a result of a reading of the reading unit in a case of causing the reading unit to perform the body reading operation, wherein the controller is configured to:

cause the reading unit to perform the body reading operation in a state that the part of the body of the user is placed at a predetermined position on the reading surface and to cause the memory to store second reference reading data which is obtained from a result of a reading performed by the reading unit in a case of causing the reading unit to perform the body reading operation; and perform the setting of the apparatus based on the body reading data and the second reference reading data.

29. An apparatus comprising:

a reading surface extending in a first direction;

a reading unit configured to read a manuscript on the reading surface; and a controller, wherein the reading unit has:

a light emitting part extending in the first direction and configured to emit light toward the reading surface; and a plurality of light receiving parts which are arranged side by side in the first direction and each of which is configured to output a signal having a value corresponding to a characteristic of the light received by each of the plurality of light receiving parts, and the controller is configured to:

cause the light emitting part to emit the light;

obtain reading data based on the value of the signal outputted from each of the light receiving parts;

obtain position information as information of a position of a setting member which is arranged by a user on the reading surface after the controller has started causing the light emitting part to emit the light, based on a position in the first direction of a light receiving part, of the light receiving parts, in which the reading data indicates that the value of the signal outputted therefrom has changed by not less than a predetermined amount from the value of the signal at a point of time at which the controller has started causing the light emitting part to emit the light; and perform a setting of the apparatus or of a peripheral device configured to communicate with the apparatus, based on the position information.

* * * * *